US010761519B2

(12) United States Patent
Tsutsumi et al.

(10) Patent No.: US 10,761,519 B2
(45) Date of Patent: Sep. 1, 2020

(54) PRODUCT DESIGN AND PROCESS DESIGN DEVICE

(71) Applicants: HITACHI, LTD., Tokyo (JP); COMPUTER AND AUTOMATION RESEARCH INSTITUTE, HUNGARIAN ACADEMY OF SCIENCES, Budapest (HU)

(72) Inventors: Daisuke Tsutsumi, Tokyo (JP); Yumiko Ueno, Tokyo (JP); Youichi Nonaka, Tokyo (JP); Takahiro Nakano, Tokyo (JP); József Váncza, Budapest (HU); Gábor Erdős, Budapest (HU); Dávid Gyulai, Budapest (HU); András Kovács, Budapest (HU); Bence Tipary, Budapest (HU)

(73) Assignees: HITACHI, LTD., Tokyo (JP); Computer and Automation Research Institute, Hungarian Academy of Sciences, Budapest (HU)

( * ) Notice: Subject to any disclaimer, the term of this patent is extended or adjusted under 35 U.S.C. 154(b) by 28 days.

(21) Appl. No.: 16/183,766

(22) Filed: Nov. 8, 2018

(65) Prior Publication Data
US 2019/0146465 A1 May 16, 2019

(30) Foreign Application Priority Data

Nov. 14, 2017 (JP) .................................. 2017-218851

(51) Int. Cl.
*G05B 19/418* (2006.01)
(52) U.S. Cl.
CPC .................. *G05B 19/41865* (2013.01); *G05B 2219/31427* (2013.01); *G05B 2219/32423* (2013.01)

(58) Field of Classification Search
CPC ........ G05B 19/41805; G05B 19/41865; G05B 2219/31427; G05B 2219/32149; G05B 2219/32423
See application file for complete search history.

(56) References Cited

U.S. PATENT DOCUMENTS

| 5,323,333 A * | 6/1994 | Johnson ............. G05B 19/4097 703/1 |
| 2005/0177381 A1* | 8/2005 | Parija ..................... G06Q 10/04 703/2 |
| 2020/0012947 A1* | 1/2020 | Barton .................. G06Q 10/04 |

FOREIGN PATENT DOCUMENTS

JP 2015-111359 A 6/2015

* cited by examiner

*Primary Examiner* — Chad G Erdman
(74) *Attorney, Agent, or Firm* — Mattingly & Malur, PC

(57) ABSTRACT

A product design and process design device includes: a storage unit that stores design specification information containing the tolerance of a dimensional variation at any site of an assembly product, part dimension error information, assembly facility error information, assembly tolerance information, the part dimension error information, and the assembly facility error information, part manufacturing cost information, and facility investment cost information with respect to the assembly facility error information; a tolerance distribution processing unit that uses the assembly tolerance information to generate proposed tolerance distributions that differ in distributional combination with respect to each error, and calculates part manufacturing costs and facility investment costs; a facility planning processing unit that determines a proposed tolerance distribution, with, as an evaluation index, total production costs respectively including the sums of the part manufacturing costs and the facility investment costs calculated; and an output unit that outputs the proposed tolerance distribution.

16 Claims, 25 Drawing Sheets

FIG. 3
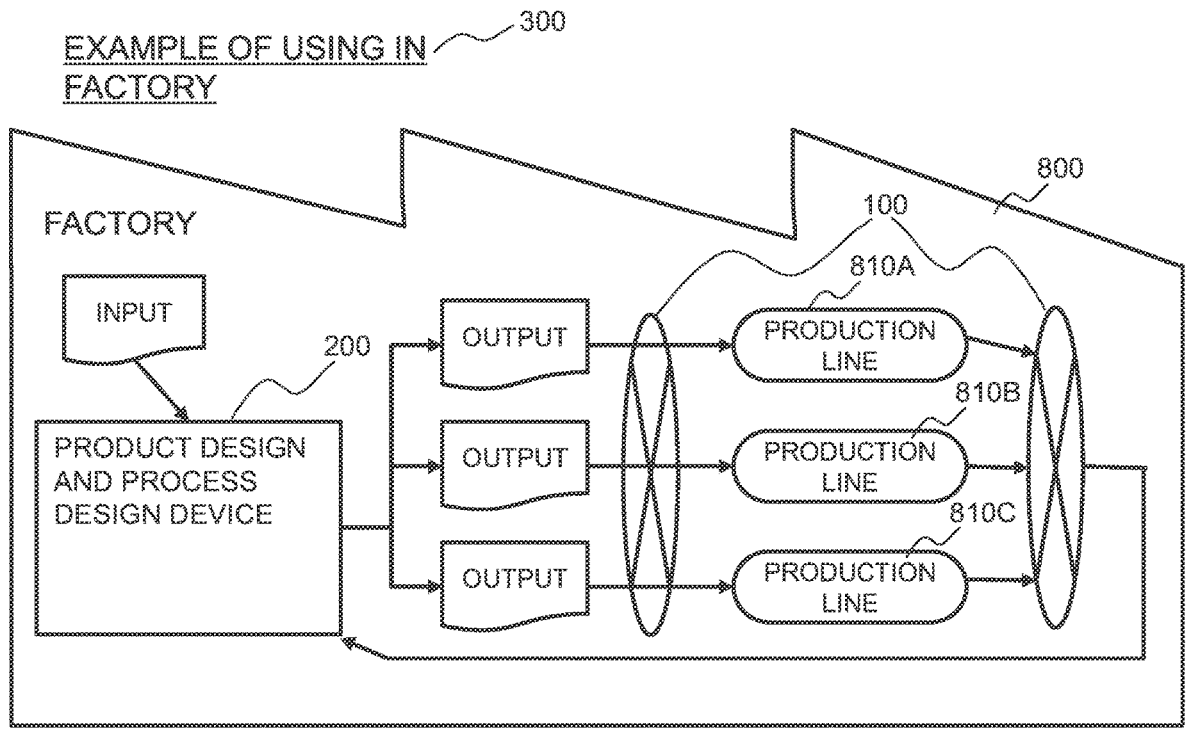
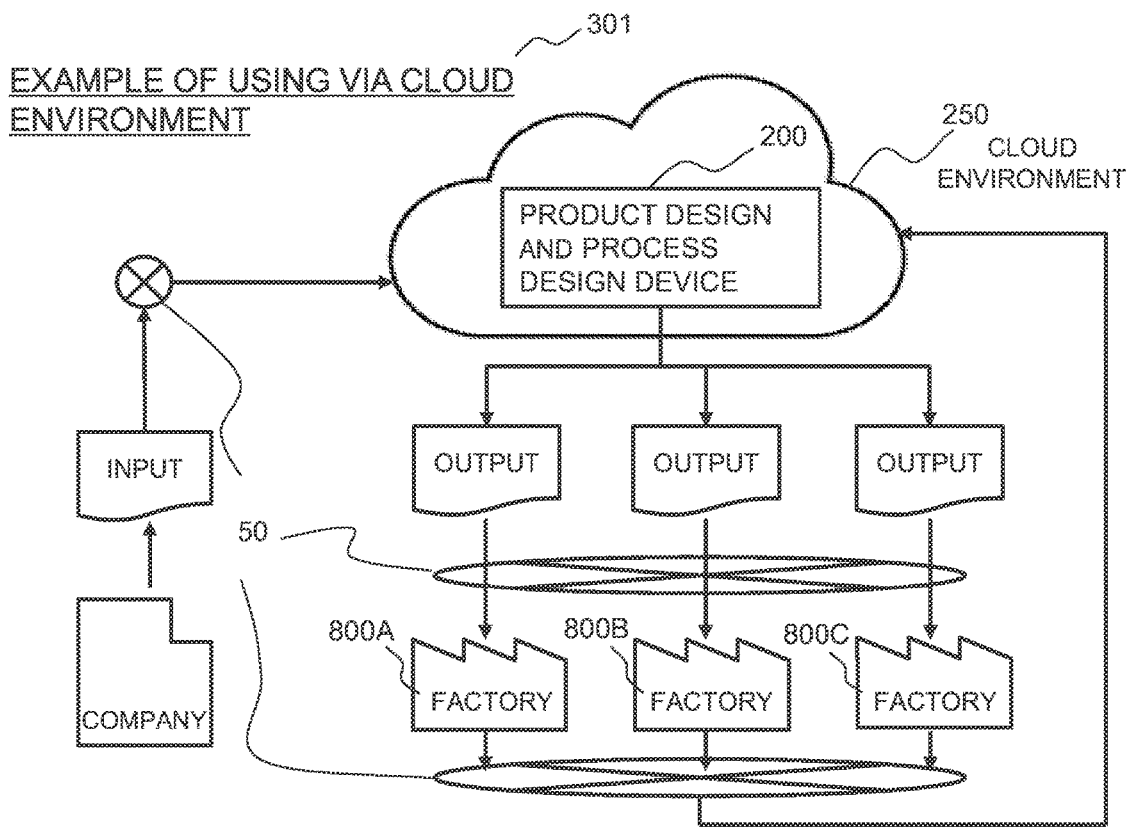

DESIGN SPECIFICAION INFORMATION

| (mm) | FIRST PRODUCT | SECOND PRODUCT | THIRD PRODUCT | FOURTH PRODUCT | FIFTH PRODUCT | SIXTH PRODUCT | SEVENTH PRODUCT | EIGHTH PRODUCT |
|---|---|---|---|---|---|---|---|---|
| LOWER LIMIT | 0.3 | 0.3 | 0.25 | 0.25 | 0.2 | 0.15 | 0.1 | 0.05 |
| UPPER LIMIT | 1.9 | 1.4 | 1.35 | 1.25 | 1.1 | 0.95 | 0.5 | 0.35 |
| MEDIAN VALUE | 1.1 | 0.85 | 0.8 | 0.75 | 0.65 | 0.55 | 0.3 | 0.2 |
| MARGIN | 1.6 | 1.1 | 1.1 | 1.0 | 0.9 | 0.8 | 0.4 | 0.3 |
| $V_i$ DESIGN SPECIFICATION | 0.8 | 0.55 | 0.55 | 0.5 | 0.45 | 0.4 | 0.2 | 0.15 |

ASSEMBLY FACILITY INFORMATION

| ASSEMBLY FACILITY ID | ASSEMBLY FACILITY ERROR |
|---|---|
| XA001 | 0.50 |
| XA002 | 0.25 |
| XA003 | 0.15 |
| XC001 | - |
| XC002 | - |
| XC003 | - |

PART MANUFACTURING COST INFORMATION
WITH RESPECT TO PART DIMENSION ERROR

| PART | DIMENSION ERROR (±) (mm) | | | | | MANUFACTURING COST ($) | | | | |
|---|---|---|---|---|---|---|---|---|---|---|
| | (1) | (2) | (3) | (4) | (5) | (1) | (2) | (3) | (4) | (5) |
| A | 0.01 | 0.05 | 0.1 | 0.25 | 0.5 | 16 | 8 | 4 | 2 | 1.8 |
| B | 0.01 | 0.05 | 0.1 | 0.25 | 0.5 | 16 | 8 | 4 | 2 | 1.8 |
| C | 0.01 | 0.05 | 0.1 | 0.25 | 0.5 | 4 | 2.5 | 2 | 1.8 | 1.5 |

FACILITY INVESTMENT COST INFORMATION
WITH RESPECT TO ASSEMBLY FACILITY ERROR

| ASSEMBLY FACILITY ERROR (±) (mm) | INITIAL FACILITY INVESTMENT COST ($) | ADDITIONAL FACILITY INVESTMENT COST ($) |
|---|---|---|
| 1 | 1,000,000 | 0 |
| 0.5 | 1,000,000 | 500,000 |
| 0.25 | 1,000,000 | 750,000 |
| 0.1 | 1,000,000 | 1,000,000 |
| 0.05 | 1,000,000 | 1,750,000 |
| 0.01 | 1,000,000 | 3,000,000 |

FIG. 16

PART MANUFACTURING COST WITH RESPECT TO PROPOSED TOLERANCE
DISTRIBUTION: (INTERMEDIATE OUTPUT) (EXAMPLE OF FIRST PRODUCT)

|            | PART A ($) | PART B ($) | PART C ($) |
|------------|------------|------------|------------|
| PROPOSAL 1 | 2          | 2          | 1.8        |
| PROPOSAL 2 | 2          | 2          | 1.86       |
| PROPOSAL 3 | 2.66       | 2.33       | 1.93       |
| PROPOSAL 4 | 4          | 3          | 2          |

FACILITY INVESTMENT COST WITH RESPECT TO PROPOSED TOLERANCE
DISTRIBUTION: (INTERMEDIATE OUTPUT) (EXAMPLE OF FIRST PRODUCT)

|                              | ADDITIONAL INVESTMENT TO EXISTING FACILITY ||| NEW INVESTMENT |
|------------------------------|-----------|-----------|-----------|----------------|
| FACILITY ID                  | XA001     | XA002     | XA003     |                |
| ASSEMBLY FACILITY ERROR      | 0.50      | 0.25      | 0.15      | -              |
| PROPOSAL 1 ($V_H = 0.05$)    | 1,250,000 | 1,000,000 | 833,000   | 2,750,000      |
| PROPOSAL 2 ($V_H = 0.1$)     | 500,000   | 250,000   | 83,000    | 2,000,000      |
| PROPOSAL 3 ($V_H = 0.25$)    | 250,000   | 0         | 0         | 1,750,000      |
| PROPOSAL 4 ($V_H = 0.5$)     | 0         | 0         | 0         | 1,500,000      |

FIG. 17

PRODUCTION PLANNING INFORMATION

| PRODUCTION MONTH | PRODUCTS/MONTH | | | | | | | |
|---|---|---|---|---|---|---|---|---|
| | FIRST PRODUCT | SECOND PRODUCT | THIRD PRODUCT | FOURTH PRODUCT | FIFTH PRODUCT | SIXTH PRODUCT | SEVENTH PRODUCT | EIGHTH PRODUCT |
| 17/4 | 0 | 50000 | 8000 | 28000 | 16000 | 0 | 15000 | 0 |
| 17/5 | 0 | 50000 | 8000 | 28000 | 16000 | 0 | 15000 | 0 |
| 17/6 | 0 | 50000 | 8000 | 28000 | 16000 | 0 | 15000 | 0 |
| 17/7 | 0 | 50000 | 8000 | 28000 | 16000 | 0 | 15000 | 0 |
| 17/8 | 0 | 50000 | 8000 | 28000 | 16000 | 0 | 15000 | 0 |
| 17/9 | 0 | 50000 | 20000 | 28000 | 16000 | 0 | 15000 | 0 |
| 17/10 | 0 | 50000 | 20000 | 28000 | 16000 | 0 | 15000 | 0 |
| 17/11 | 0 | 50000 | 20000 | 28000 | 16000 | 0 | 15000 | 0 |
| 17/12 | 0 | 50000 | 20000 | 28000 | 16000 | 0 | 15000 | 0 |
| 18/1 | 0 | 40000 | 20000 | 28000 | 18000 | 0 | 15000 | 0 |
| 18/2 | 0 | 40000 | 20000 | 28000 | 18000 | 0 | 15000 | 0 |
| 18/3 | 0 | 40000 | 20000 | 28000 | 18000 | 0 | 15000 | 0 |
| 18/4 | 8000 | 40000 | 30000 | 40000 | 18000 | 4000 | 10000 | 0 |
| 18/5 | 8000 | 40000 | 30000 | 40000 | 18000 | 4000 | 10000 | 0 |
| 18/6 | 8000 | 40000 | 30000 | 40000 | 18000 | 4000 | 10000 | 0 |
| 18/7 | 8000 | 40000 | 30000 | 40000 | 18000 | 4000 | 10000 | 0 |
| 18/8 | 8000 | 40000 | 30000 | 40000 | 18000 | 4000 | 10000 | 0 |
| 18/9 | 8000 | 40000 | 30000 | 40000 | 18000 | 10000 | 10000 | 0 |
| 18/10 | 16000 | 40000 | 47000 | 40000 | 18000 | 10000 | 0 | 0 |
| 18/11 | 16000 | 40000 | 47000 | 40000 | 18000 | 10000 | 0 | 0 |
| 18/12 | 16000 | 40000 | 47000 | 40000 | 18000 | 10000 | 0 | 0 |
| 19/1 | 16000 | 30000 | 47000 | 40000 | 23000 | 10000 | 0 | 20000 |
| 19/2 | 16000 | 30000 | 47000 | 40000 | 23000 | 10000 | 0 | 20000 |
| 19/3 | 16000 | 30000 | 42000 | 40000 | 23000 | 10000 | 0 | 20000 |
| ... | ... | ... | ... | ... | ... | ... | ... | ... |
| 20/12 | 30000 | 0 | 42000 | 50000 | 30000 | 30000 | 0 | 20000 |

FIG. 18

ASSEMBLY LINE INFORMATION

| ASSEMBLY LINE ID | MAXIMUM PRODUCTION/ MONTH (PRODUCTS) | ASSEMBLY FACILITY ID FOR PART A | ASSEMBLY FACILITY ID FOR PART C |
|---|---|---|---|
| L001 | 50000 | XA001 | XC001 |
| L002 | 50000 | XA002 | XC002 |
| L003 | 50000 | XA003 | XC003 |

FIG. 19

FACILITY PLANNING INFORMATION

| PRODUCTION MONTH | PRODUCTS MANUFACTURED ON EACH ASSEMBLY LINE | | | | |
| --- | --- | --- | --- | --- | --- |
| | L001 | L002 | L003 | NEW LINE (L004) | NEW LINE (L005) |
| 17/4 | 2 | 3, 4 | 5, 7 | - | - |
| 17/5 | 2 | 3, 4 | 5, 7 | - | - |
| 17/6 | 2 | 3, 4 | 5, 7 | - | - |
| 17/7 | 2 | 3, 4 | 5, 7 | - | - |
| 17/8 | 2 | 3, 4 | 5, 7 | - | - |
| 17/9 | 2 | 3, 4 | 5, 7 | - | - |
| 17/10 | 2 | 3, 4 | 5, 7 | - | - |
| 17/11 | 2 | 3, 4 | 5, 7 | - | - |
| 17/12 | 2 | 3, 4 | 5, 7 | - | - |
| 18/1 | 2 | 3, 4 | 5, 7 | - | - |
| 18/2 | 2 | 3, 4 | 5, 7 | - | - |
| 18/3 | 2 | 3, 4 | 5, 7 | - | - |
| 18/4 | 1, 2 | 4 | 5, 7 | 3, 6 | - |
| 18/5 | 1, 2 | 4 | 5, 7 | 3, 6 | - |
| 18/6 | 1, 2 | 4 | 5, 7 | 3, 6 | - |
| 18/7 | 1, 2 | 4 | 5, 7 | 3, 6 | - |
| 18/8 | 1, 2 | 4 | 5, 7 | 3, 6 | - |
| 18/9 | 1, 2 | 4 | 5, 7 | 3, 6 | - |
| 18/10 | 2 | 4 | 1, 5, 6 | 3 | - |
| 18/11 | 2 | 4 | 1, 5, 6 | 3 | - |
| 18/12 | 2 | 4 | 1, 5, 6 | 3 | - |
| 19/1 | 1, 2 | 4 | 5, 6 | 3 | 8 |
| 19/2 | 1, 2 | 4 | 5, 6 | 3 | 8 |
| 19/3 | 1, 2 | 4 | 5, 6 | 3 | 8 |
| ... | ... | ... | ... | ... | ... |
| 20/12 | 1 | 4 | 5 | 3 | 6, 8 |

PRODUCT DESIGN AND PROCESS DESIGN DEVICE

CLAIM OF PRIORITY

This application claims the priority from the Japanese Patent Application No. 2017-218851 filed on Nov. 14, 2017, the content of which is incorporated herein by reference into this application.

BACKGROUND

Technical Field

The present invention relates to a technology of a process design and process design device.

Related Art

JP 2015-111359 A discloses a design program that causes a computer to execute processing of: extracting a similar part that is similar to a design part to be designed, from a storage unit that stores information on parts manufactured previously; acquiring a tolerance distribution average value for a design value at a site of the design part combined with another part; acquiring a distribution average value for the actually measured value of a dimension at the site of the similar part combined with the part; calculating the difference between the acquired distribution average value and tolerance distribution average value; and calculating, when the difference is larger than a threshold value, a changed dimension in the case of changing a dimension at a second site of the design part, other than the site combined with the part.

SUMMARY

The technology described in JP 2015-111359 A fails to consider any assembly process or assembly facility for structures composed of multiple parts, thus resulting in rework for product design for the optimization of an assembly process, or resulting in a requirement for a larger-than expected additional investment for the maintenance of an assembly facility in some cases.

An object of the present invention is to provide a product design and process design device with greater investment efficiency.

The present application encompasses more than one means for at least partially solving the problems mentioned above, and an example of the means will be given as follows. In order to solve the problems mentioned above, a product design and process design device according to an aspect of the present invention characteristically includes: a storage unit that stores design specification information containing the tolerance of a dimensional variation at any site of an assembly product, part dimension error information on a part of the assembly product, related to the design specification information, assembly facility error information on a facility that assembles the assembly product, assembly tolerance information containing a relational expression among the design specification information, the part dimension error information, and the assembly facility error information, part manufacturing cost information with respect to the part dimension error information, and facility investment cost information with respect to the assembly facility error information; a tolerance distribution processing unit that uses the assembly tolerance information to generate proposed tolerance distributions that differ in distributional combination with respect to part dimension errors and assembly facility errors, and calculates part manufacturing costs based on the part dimension errors contained in the proposed tolerance distributions generated and facility investment costs based on the assembly facility errors contained in the proposed tolerance distributions generated; a facility planning processing unit that calculates, as an evaluation index, total production costs respectively including the sums of the part manufacturing costs and the facility investment costs calculated, and determines a proposed tolerance distribution that makes the evaluation index optimum; and an output unit that outputs the optimum proposed tolerance distribution determined.

According to the present invention, a product design and process design device with greater investment efficiency can be provided. Objects, configurations, and advantageous effects other than the foregoing will be evident from the following description of an embodiment.

BRIEF DESCRIPTION OF DRAWINGS

FIG. 3 is a diagram illustrating examples of the mode of using the product design and process design device;

FIG. 16 is a diagram showing examples of the part manufacturing cost and facility investment cost with respect to the proposed tolerance distribution;

FIG. 17 is a diagram showing an example of the data structure of production planning information;

FIG. 18 is a diagram showing an example of the data structure of assembly line information;

FIG. 19 is a diagram showing an example of the data structure of facility planning information;

DETAILED DESCRIPTION

Figure 1:
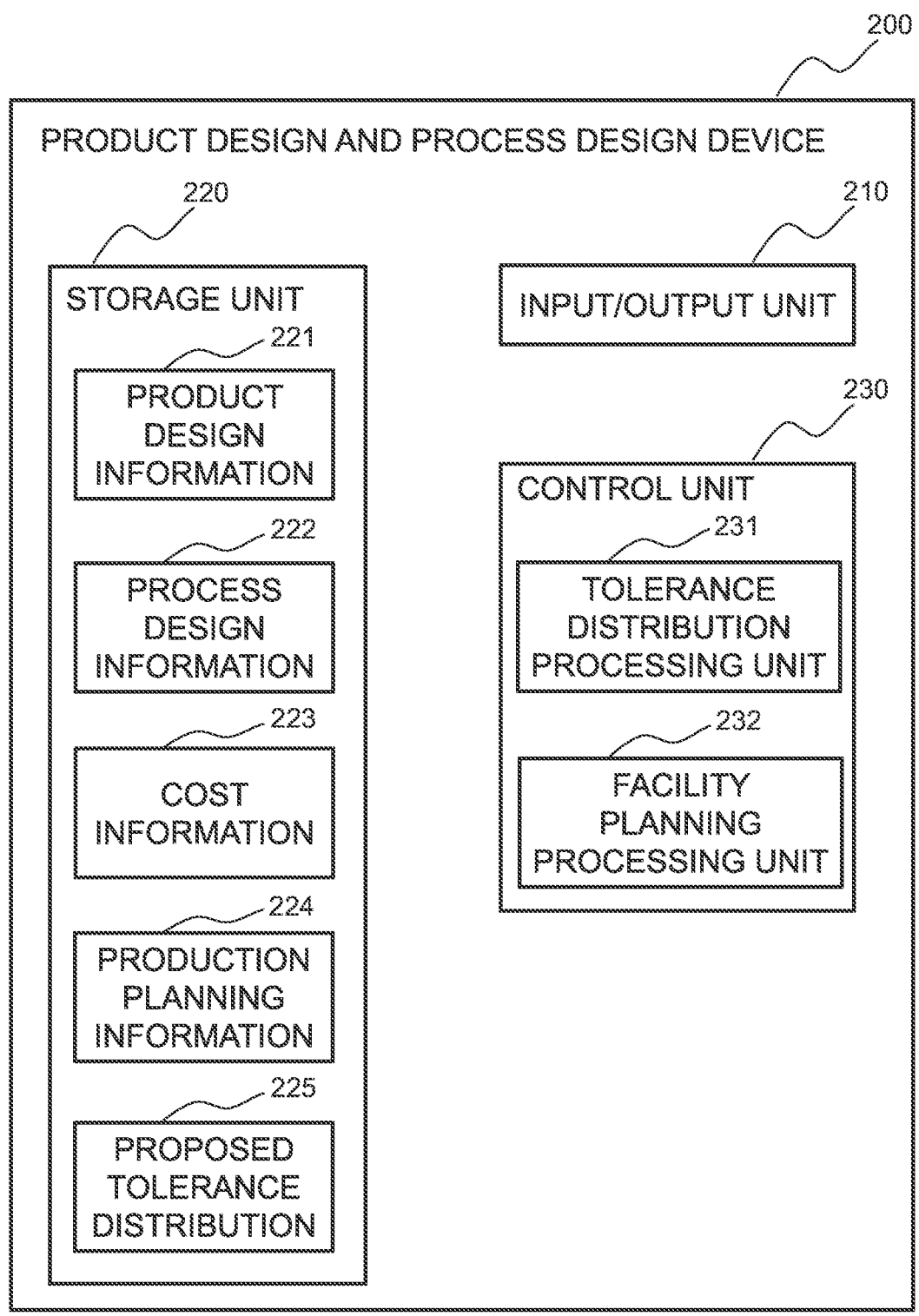
FIG. 1 is a diagram illustrating an example of the configuration of a product design and process design device.

An embodiment according to the present invention will be described below with reference to the drawings. It is to be noted that in all of the drawing for explaining the embodiment, like members are denoted by like numerical references in principle, and repeated descriptions thereof may be omitted in some cases. In addition, in the following embodiment, obviously, the constituent elements (including element steps) are not necessarily to be considered essential, e.g., unless otherwise expressly provided, and unless considered clearly essential in principle. In addition, obviously, the phrases of "being composed of A", "being made from A", "having A", and "including A" are not to be considered to exclude other elements, e.g., unless only the element is expressly provided herein otherwise. Likewise, in the following embodiment, the reference to the shapes, positional relationships, and the like of the constituent elements and the like is intended to encompass equivalents substantially approximate or similar to the shapes and the like, e.g., unless otherwise expressly provided, and unless considered clear in principle.

FIG. 1 is a diagram illustrating an example of the configuration of a product design and process design device. The product design and process design device 200 has an input/output unit 210, a storage unit 220, and a control unit 230. The storage unit 220 contains therein product design information 221, process design information 222, cost information 223, production planning information 224, and proposed tolerance distribution 225. The control unit 230 includes therein a tolerance distribution processing unit 231 and a facility planning processing unit 232.

Figure 4:
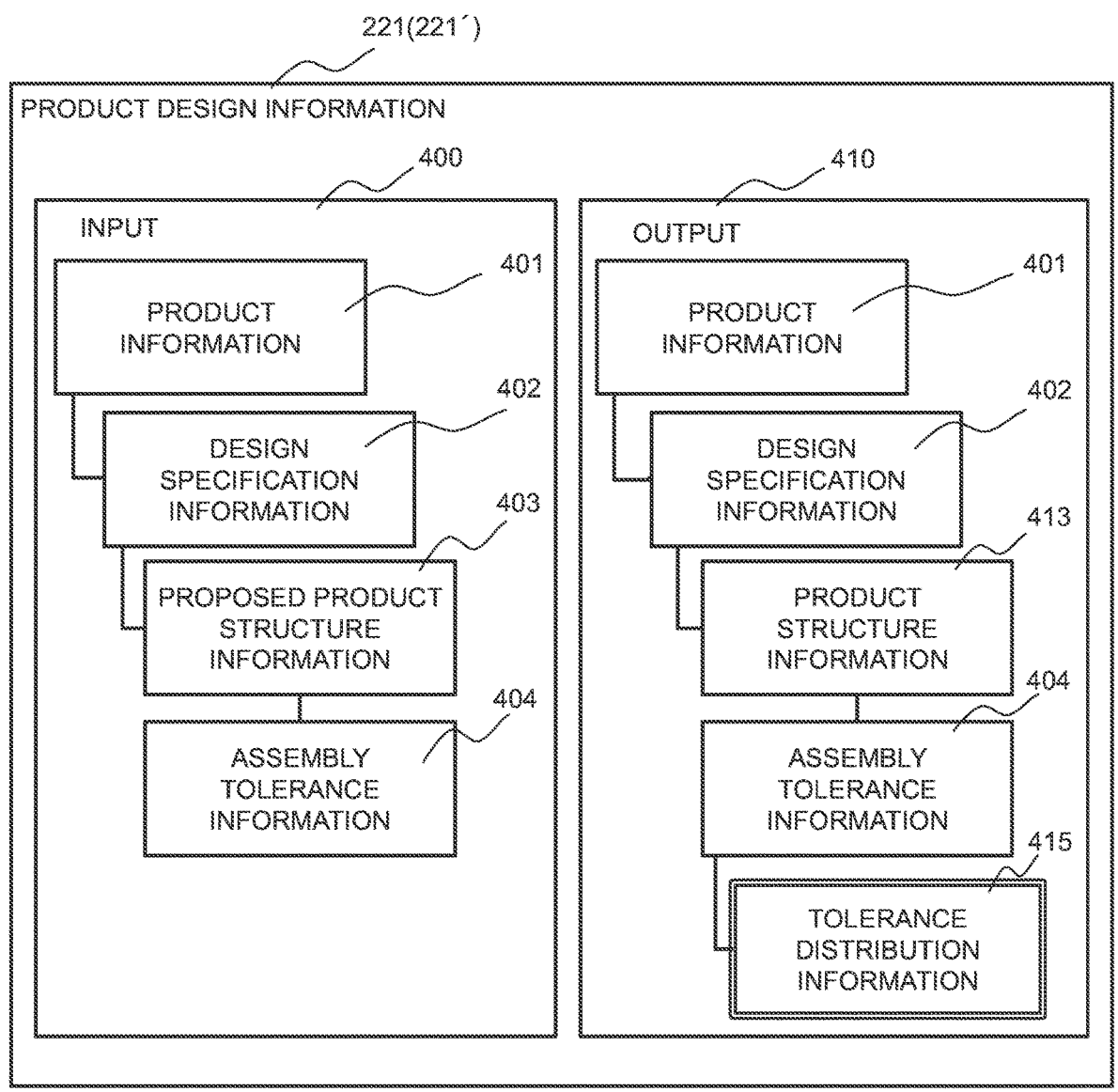
FIG. 4 is a diagram illustrating an example of the data structure of product design information.

FIG. 4 is a diagram illustrating an example of the data structure of product design information. The product design information 221 contains therein information on input 400 and output 410, and the information contained in the product design information 221 has information on either the input 400 or the output 410, or the both types of information. According to the present embodiment, for the sake of convenience, the information contained in each of the input 400 and the output 410 is handled as separated information, but may be the same information actually.

The input 400 of the product design information 221 contains therein product information 401 on a product to be designed. In this regard, the product to be designed may refer to multiple products such as similar products. In addition, the input 400 contains therein design specification information 402 as the product information 401. In this regard, for one product, there may be multiple pieces of design specification information that should be satisfied simultaneously. In addition, as related information which is more specific than the design specification information 402, proposed product structure information 403 is linked in the product design information 221. Further, assembly tolerance information 404 depending on the product information 401, the design specification information 402, and the proposed product structure information 403 is associated and stored.

Figure 11:
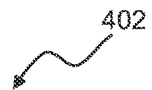
FIG. 11 is a diagram showing an example of the data structure of design specification information.

FIG. 11 is a diagram showing an example of the data structure of design specification information. According to the design specification information 402, for each product, the parameter of an item under the design specifications is linked to the lower limit, the upper limit, the median value, the margin, and the $V_f$ design specification. For example, in the case of a first product, the lower limit is "0.3 mm", the upper limit is "1.9 mm", the median value is "1.1 mm", the margin is "1.6 mm", and the $V_f$ design specification is "0.8 mm". It is to be noted that the information refers to information that indicates the allowance of variation $V_f$ in clearance f between a part A and a part C in accordance with an example of a product according to the present invention as will be described later. In this regard, assuming that the upper value and lower value of the allowance vary evenly from the median value, the variation $V_f$ is half the value of the margin between the upper limit and the lower limit. In this regard, the upper limit and the lower limit are determined, for example, from the viewpoint of 6σ.

Figure 10:
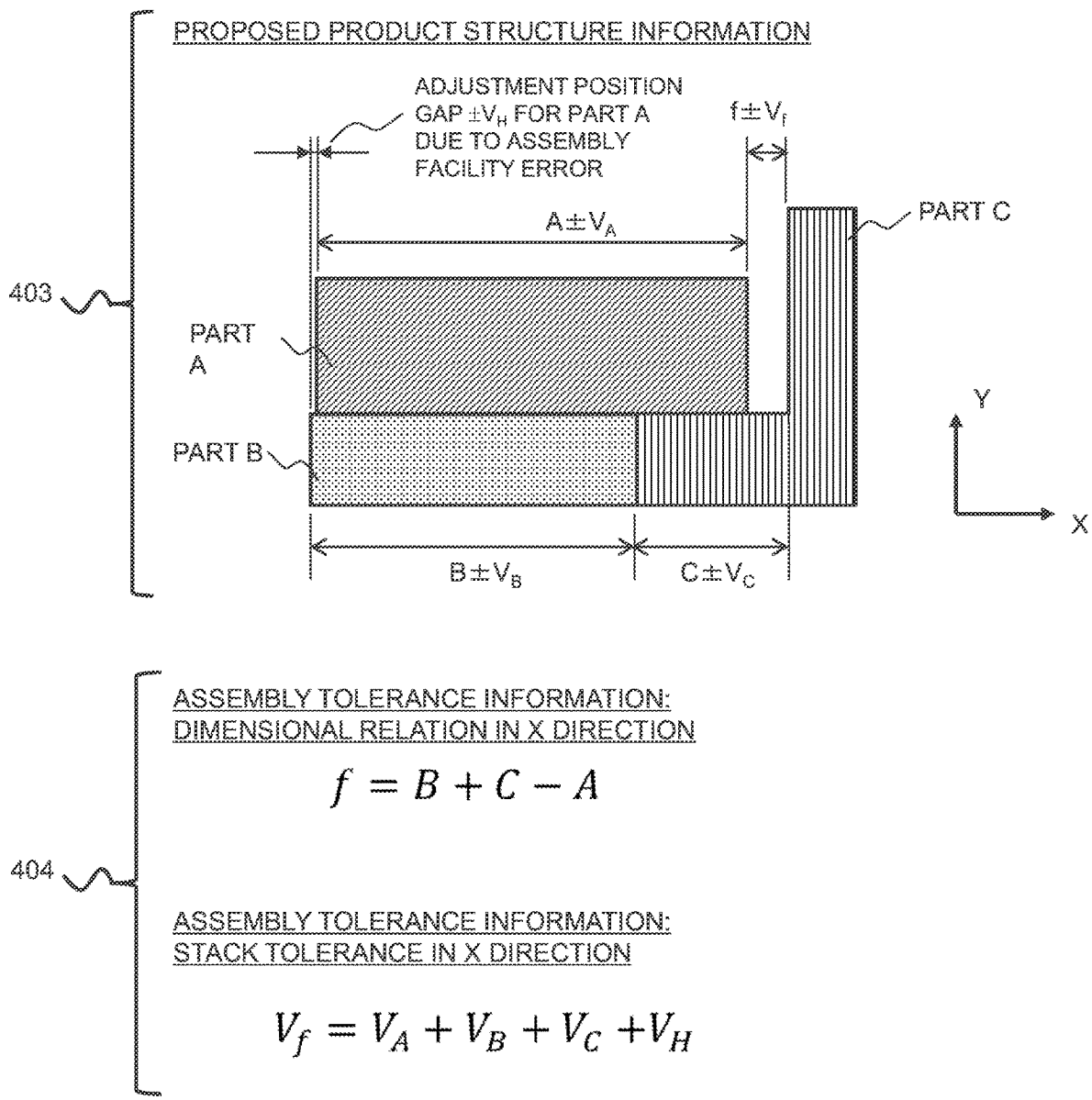
FIG. 10 is a diagram illustrating examples of the data structures of proposed product structure information and assembly tolerance information.

FIG. 10 is a diagram illustrating examples of the data structures of the proposed product structure information and assembly tolerance information. The proposed product structure information 403 refers to information that specifies a proposed structure for a product. In this regard, information on a condition where a structure is determined, such as the sizes of fundamental parts, the coupling relation therebetween, and the coupling direction thereof, while detailed dimensions and the error tolerance are not determined is referred to as the proposed product structure information 403.

For example, the proposed product structure information 403 contains therein information for specifying parts to be used and the positional relation therebetween. According to the present embodiment, for example, as shown in FIG. 10, the product is composed of three parts of part A, part B, and part C. In addition, the part B and the part C are adapted to be adjacent in the X direction, and the part A is adapted to be adjacent to the part B and the part C in the Y direction. In this regard, A, B, and C in FIG. 10 denote representative dimensions of the respective parts, and $V_A$, $V_B$, and $V_C$ denote part dimension errors due to the production methods for each part.

The proposed product structure information 403 contains therein information that indicates that the use of the part A, the part B, and the part C, and the coupling relations therebetween like the illustrated positional relations are determined as a structure while the part dimension error $V_A$ of the part A in the X direction, the part dimension error $V_B$ of the part B in the X direction, the part dimension error $V_C$ of the part C in the X direction, an adjustment position gap $V_H$ for the part A in the X direction due to an assembly facility error caused depending on the accuracy of an assembly facility, and the error $V_f$ of the gap between the part A and the part C in the X direction, which results from assembling, are not determined.

The assembly tolerance information 404 refers to information containing relational expressions that respectively show the dimensional relation between the parts constituting the product and the relation of the stack tolerance caused by the part dimension errors and the part assembly error. In the example according to the present embodiment, the positional relation between the parts constituting the product in the X direction is expressed by the following formula (1):

$$f = B + C - A \quad \text{Formula (1)}$$

Further, the stack tolerance in the X direction, which is caused by the part dimension errors and the part assembly error, is expressed by the following expression (2):

$$V_f = V_A + V_B V_c + V_H \quad \text{Formula (2)}$$

As a matter of course, the formula (1) and formula (2) described above correspond to an example of the first product, and different relations of error are produced for the other products, and different formulas are thus required for each product. In addition, for the calculation of the tolerance, a method such as finding a square sum may be used, besides the method of stack like the formula (2) above.

For example, as a different example of the assembly process, a case of assembling the part B and the part C, then adding a step of measuring the assembly condition of the part B and the part C, and assembling the part A in accordance with the measurement result will be provided by way of example. In this case, the part dimension errors of the part B and the part C have no influence on the eventual variation in dimension, because the errors are reflected by the measurement in assembling the part A. When such a measurement step is added, the tolerance calculation formula is expressed by the following formula (3):

$$V_f = V_A + V_H \quad \text{Formula (3)}$$

The output 410 of the product design information 221 contains therein product information 401 on a product to be designed. In this regard, the product to be designed may refer to multiple products such as similar products. In addition, the output 410 contains therein design specification information 402 as the product information 401. In addition, as related information which is more specific than the design specification information 402, product structure information 413 is linked in the product design information 221. Further, assembly tolerance information 404 depending on the product information 401, the design specification information 402, and the product structure information 413 is associated and stored. In addition, tolerance distribution information 415 is associated with the assembly tolerance information 404, and stored.

The product structure information 413 basically refers to information similar to the proposed product structure information 403, but differs in having information regarding to the determinate product structure. In addition, the result of sorting a proposed tolerance distribution that satisfies the assembly tolerance information 404 is stored in the tolerance distribution information 415.

Figure 5:
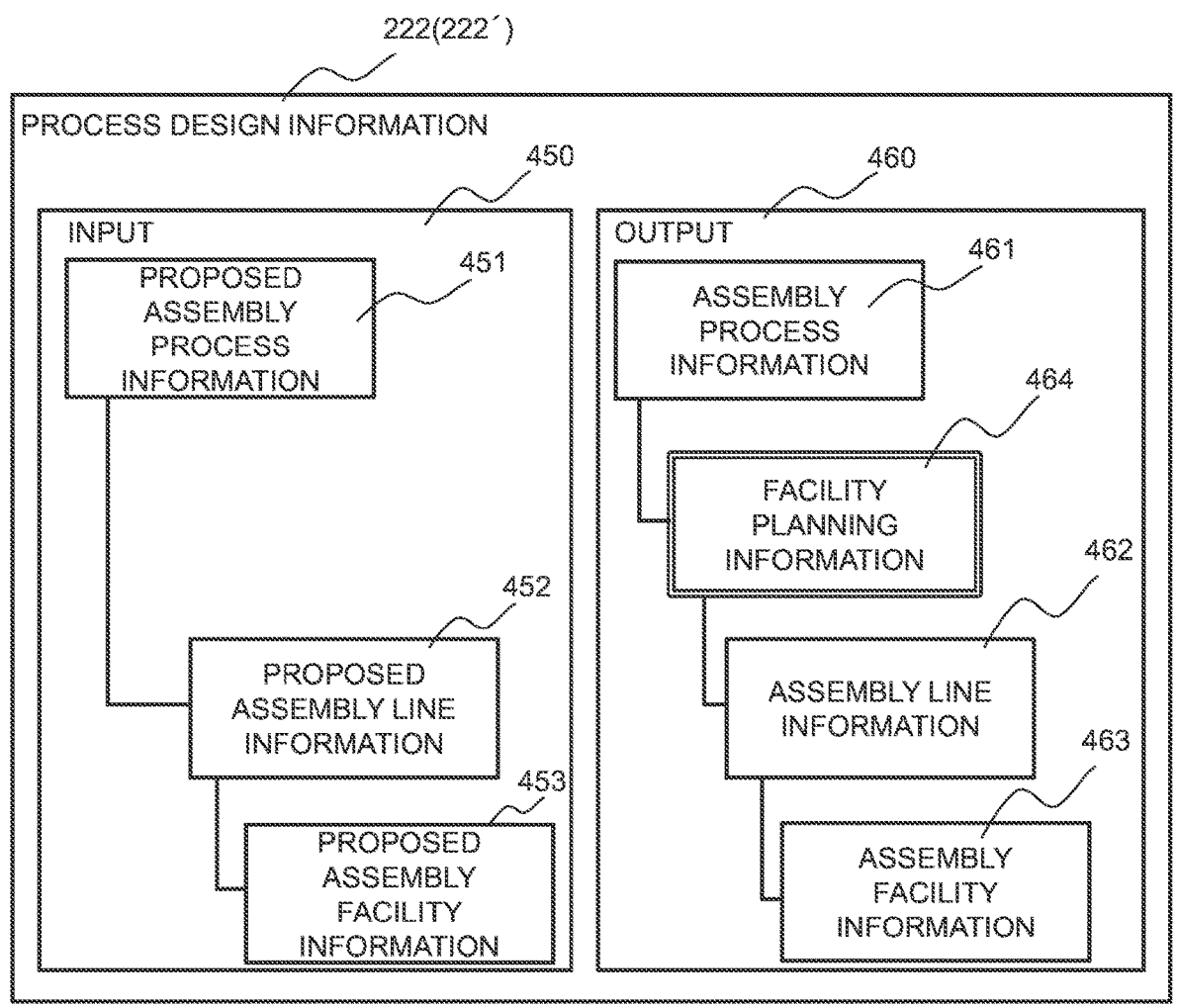
FIG. 5 is a diagram illustrating an example of the data structure of process design information.

FIG. 5 is a diagram illustrating an example of the data structure of the process design information. The process design information 222 contains therein information on input 450 and output 460, and the information contained in the process design information 222 has information on either the input 450 or the output 460, or the both types of information. According to the present embodiment, for the sake of convenience, the information contained in each of the input 450 and the output 460 is handled as separated information, but may be the same information actually.

The input 450 of the process design information 222 contains therein proposed assembly process information 451 on a product to be designed. In this regard, the proposed assembly process for the product to be designed may refer to multiple processes for each piece of the proposed product structure information 403. In addition, the input 450 has, with respect to proposed assembly line information 452, proposed assembly facility information 453 for constituting an assembly line. The proposed assembly facility information 453 may refer to multiple pieces of information with respect to the proposed assembly line information 452.

The proposed assembly process information 451 contains therein the order of assembling the product to be designed, and related information associated with the assembling. For examples, the proposed assembly process information 451 contains therein information that indicates that for a product to be designed by way of example according to the present embodiment, the part B, the part C, and the part A are assembled in this order, it is possible to achieve assembling such that there is no clearance in the X direction because the part C makes contact with the part B, an adjustment position gap $V_H$ due to an assembly facility error is caused by failing to achieve positioning due to the structure, although the part A and the part B are assembled such that the end surfaces are aligned on the negative side in the X direction (on the left-hand side in the figure).

The output 460 contains therein, for the product to be designed, eventually selected assembly process information 461, and facility planning information 464 containing assembly line information 462 and assembly facility information 463 for each product with respect to the production period.

FIG. 18 is a diagram showing an example of the data structure of the assembly line information. The assembly line information 462 has information on assembly facilities constituting an existing assembly lines for the assembly lines. In this regard, the assembly line information 462 contains therein a maximum production 462B depending on an assembly line ID 462A, and information for specifying the assembly facility ID for each part, such as an assembly facility ID 462C for the part A and an assembly facility ID 462D for the part C. In addition, the assembly line information 462 may have information such as takt time, maximum production (maximum monthly production), restrictions on the product to be designed, such as size and weight, information on accompanying facilities, and the introduction times and installation sites thereof. In addition, the assembly line information 462 may have candidates for new assembly lines that can be introduced, in place of existing assembly lines or as additional information. In addition, the proposed assembly line information 452 refers to information on a proposed condition before the determination of the assembly line, and has a similar data structure. In this regard, for the respective pieces of information mentioned above, the specification values for the line design may be used. Alternatively, the achieved values for the line introduction may be used. Furthermore, as shown in each example of using in FIG. 3, preset values may be updated on a regular basis or in real time with the use of operation performance after the line introduction. This method allows, for example, the facility planning processing unit 232 to update the maximum production 462B in accordance with actual performance.

Figure 13:
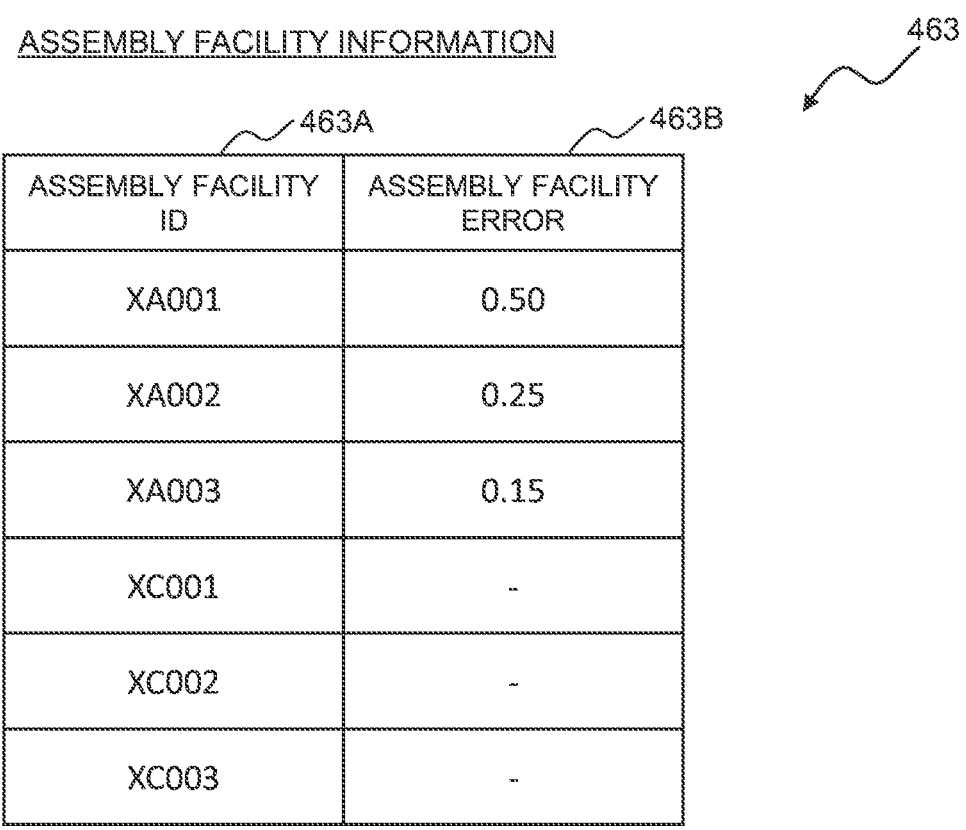
FIG. 13 is a diagram showing an example of the data structure of proposed assembly facility information and assembly facility information.

FIG. 13 is a diagram showing an example of the data structure of proposed assembly facility information and assembly facility information. The proposed assembly facility information 453 and the assembly facility information 463 have information on facility specifications for existing assembly facilities. In this regard, the facility specifications contain therein information of assembly facility error 463B depending on an assembly facility ID 463A. In addition, the facility specifications may have information such as takt time, maximum production, restrictions on the product to be designed, such as size and weight, information on accompanying facilities, and the introduction times and installation sites thereof. In addition, the facility specifications may have candidates for assembly facilities that can be introduced, in place of existing assembly facilities or as additional information. The proposed assembly facility information 453 has substantially the same data structure as the assembly facility information 463. In this regard, for the respective pieces of information mentioned above, the specification values for the facility design may be used. Alternatively, the achieved values for the facility introduction may be used. Furthermore, as shown in each example of using in FIG. 3, preset values may be updated on a regular basis or in real time with the use of operation performance after the facility introduction. This method allows, for example, the tolerance distribution processing unit 231 to update the assembly facility error information 463B in accordance with the assembly facility error increased due to aging degradation.

FIG. 19 is a diagram showing an example of the data structure of facility planning information. The facility planning information 464 has a production period (production month 464A) on the vertical axis of the table, and assembly lines (products 464B to be manufactured on each assembly line) on the horizontal axis thereof, and shows, by number, the types of products produced on the respective assembly lines for each production month.

Figure 6:
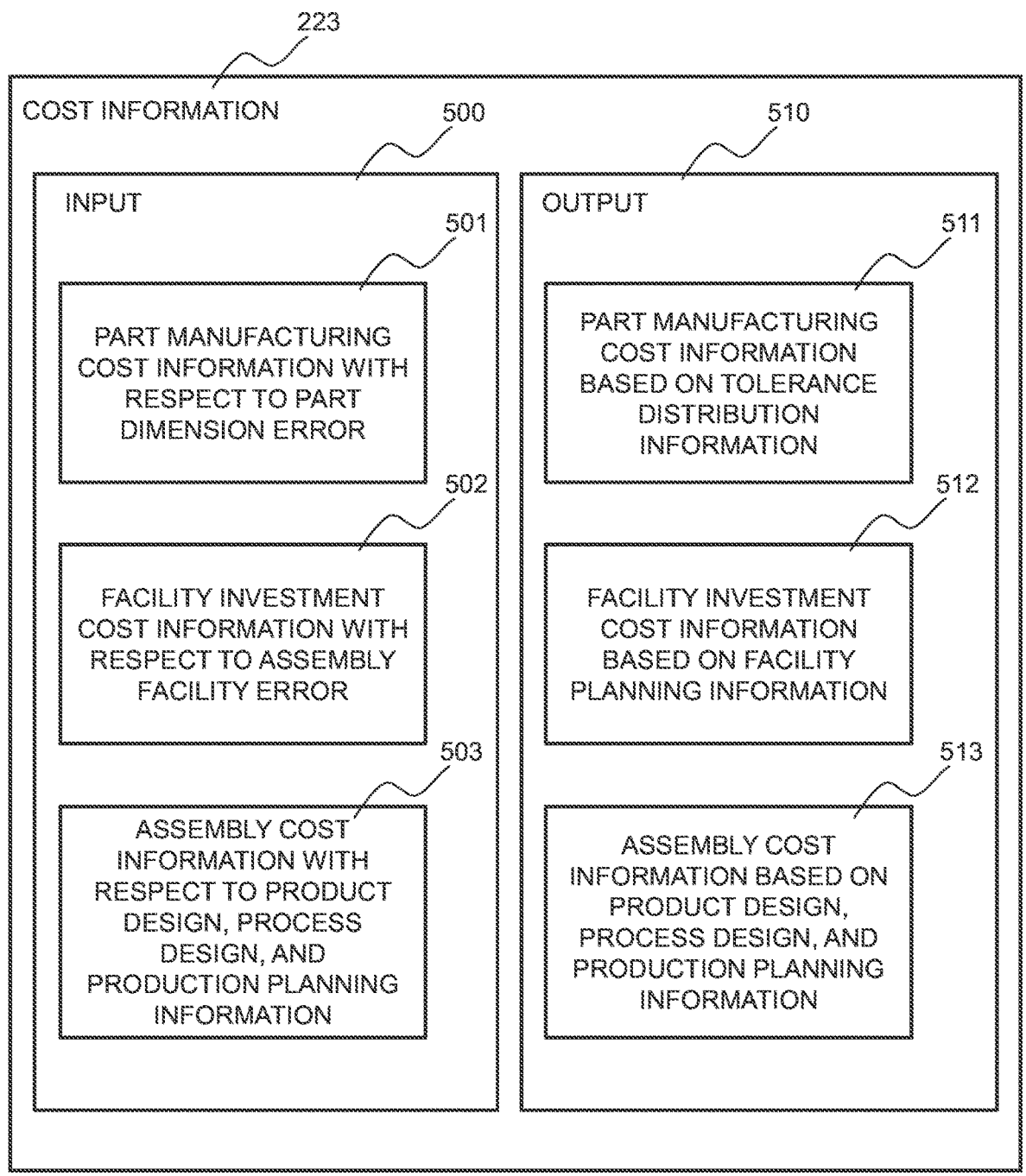
FIG. 6 is a diagram illustrating an example of the data structure of cost information.

FIG. 6 is a diagram illustrating an example of the data structure of cost information. The cost information 223 contains therein information on input 500 and output 510, and the information contained in the cost information 223 has information on either the input 500 or the output 510, or the both types of information. According to the present embodiment, for the sake of convenience, the information contained in each of the input 500 and the output 510 is handled as separated information, but may be the same information actually.

The input 500 contains therein part manufacturing cost information 501 with respect to part dimension error, facility investment cost information 502 with respect to assembly facility error, and assembly cost information 503 with respect to product design, process design, and production planning information.

Figure 14:
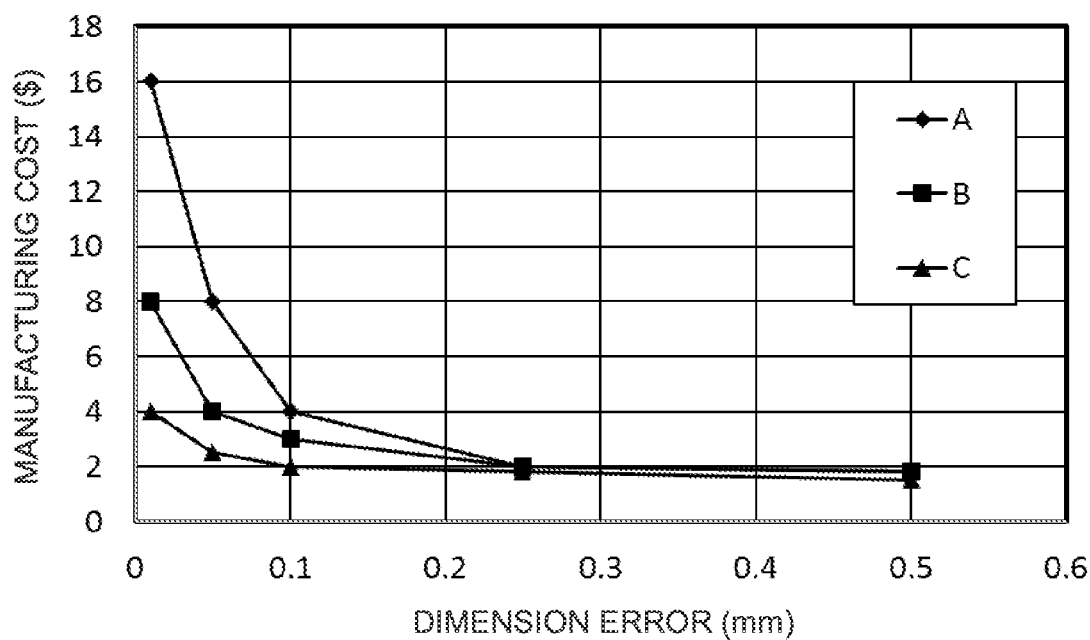
FIG. 14 is a diagram showing an example of the data structure of part manufacturing cost information with respect to part dimension error.

FIG. 14 is a diagram showing an example of the data structure of part manufacturing cost information with respect to part dimension error. For the part manufacturing cost information 501 with respect to part dimension error, manufacturing cost 501C depending on the degree of dimension error 501B is linked and stored for each part 501A. In general, the dimension error on a part depends on the method for manufacturing the part, and the manufacturing cost for the part is increased when an attempt is made to achieve a high accuracy, that is, reduce the part dimension error. The dimension error also depends on the shape and material of the part besides the manufacturing method, and the relation between the part dimension error and the part manufacturing cost thus differs from part to part. The example of the part manufacturing cost information 501 according to the present embodiment has information on the part manufacturing cost with respect to five part dimension errors for each part.

FIG. 14 shows, at the bottom thereof, the plotted data of the part manufacturing cost information 501 with respect to part dimension error in graph form. The parts A, B, and C all show a tendency to increase the manufacturing cost as the allowance of dimension error is reduced. As shown in the graph, the data between the respective plots can be calculated by linear interpolation, or may be interpolated by an existing method other than the linear interpolation. For the part manufacturing cost information 501 with respect to part dimension error, which is not limited to such an example of discrete values, a function that represents an approximate curve of the cost may be stored.

Figure 15:
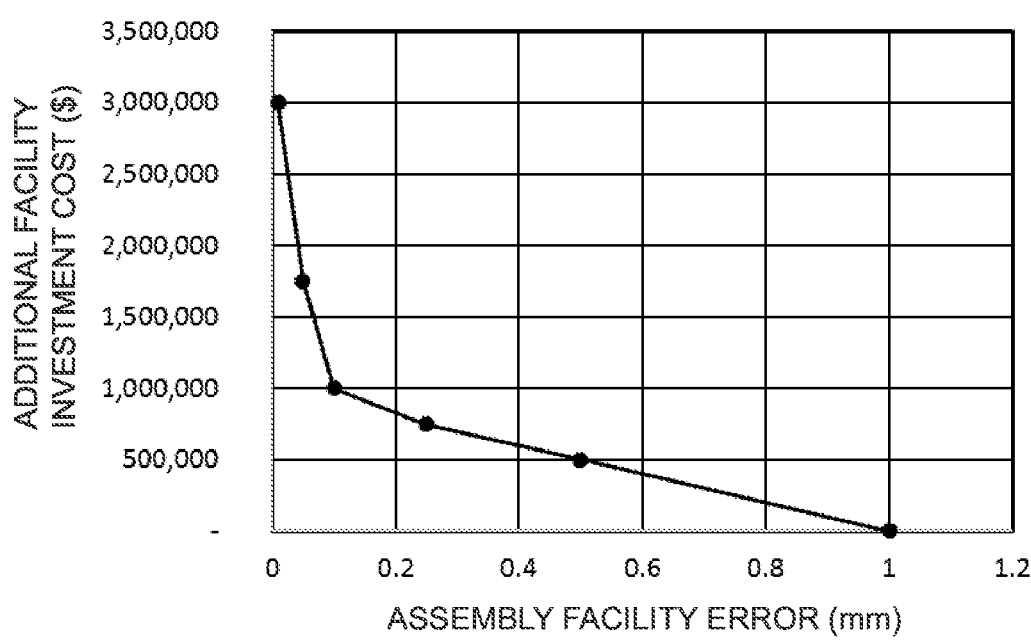
FIG. 15 is a diagram showing an example of the data structure of facility investment cost information with respect to assembly facility error.

FIG. 15 is a diagram showing an example of the data structure of facility investment cost information with respect to assembly facility error. For the facility investment cost information 502 with respect to assembly facility error, initial facility investment cost 502B depending on the degree of assembly facility error 502A and additional facility investment cost 502C are linked and stored. In general, when an attempt is made to reduce the assembly facility error, a high-accuracy assembly facility is required, thereby increasing the facility investment cost. The modes for the facility investment include a method of newly introducing an assembly facility and a mode of improving the accuracy of an existing assembly facility, which each have initial facility investment cost and additional facility investment cost defined. The example according to the present embodiment has information on facility investment cost with respect to six assembly facility errors.

FIG. 15 shows, at the bottom thereof, the plotted data of the facility investment cost information 502 with respect to assembly facility error in graph form. A tendency is shown to increase the additional facility investment cost as the allowance of the assembly facility error is reduced. As shown in the graph, the data between the respective plots can be calculated by linear interpolation, or may be interpolated by an existing method other than the linear interpolation. For the facility investment cost information 502 with respect to assembly facility error, which is not limited to such an example of discrete values, a function that represents an approximate curve of the cost may be stored. Alternatively, different values and relational expressions may be defined for each assembly facility.

The assembly cost information 503 with respect to product design, process design, and production planning information contains therein information for specifying the increase in cost with respect to the increase in assembly time that varies depending on the complexity of assembling or the like. For example, in such a case of making an increase in production by increasing the number of working people or increasing overtime work in order to satisfy a production plan, the assembly cost information 503 contains labor cost in consideration of overtime pay and the like.

The output 510 of the cost information 223 contains therein part manufacturing cost information 511 based on tolerance distribution information, facility investment cost information 512 based on facility planning information, and assembly cost information 513 based on product design, process design, and production planning information.

The part manufacturing cost information 511 based on tolerance distribution information, the facility investment cost information 512 based on facility planning information, and the assembly cost information 513 based on product design, process design, and production planning information respectively refer to information that indicates part manufacturing cost information calculated with reference to the part manufacturing cost information 501 with respect to part dimension error depending on the part dimension error when the part dimension error is fixed on the basis of tolerance distribution information determined, information that indicates facility investment cost information calculated with reference to the facility investment cost information 502 with respect to assembly facility error depending on the assembly facility error when the assembly facility error is fixed on the basis of facility planning information determined, and information that indicates assembly cost information such as labor cost, based on the product design, the process design, and the production planning information.

Figure 7:
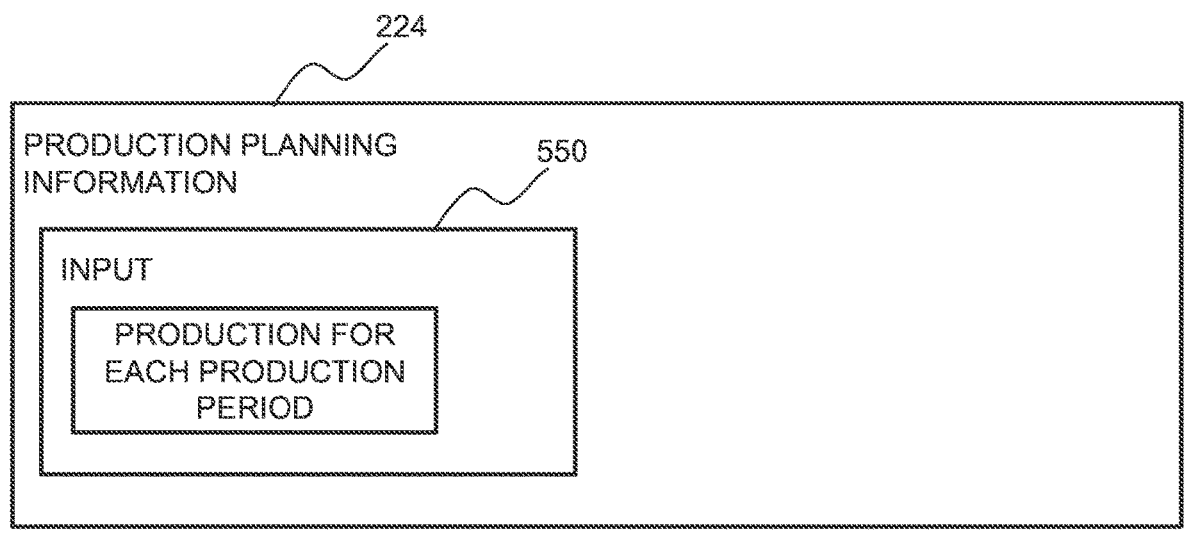
FIG. 7 is a diagram illustrating an example of the data structure of production planning information.

FIG. 7 is a diagram illustrating an example of the data structure of production planning information. The production planning information 224 contains therein at least production information for each production period as input 550.

Figure 12:
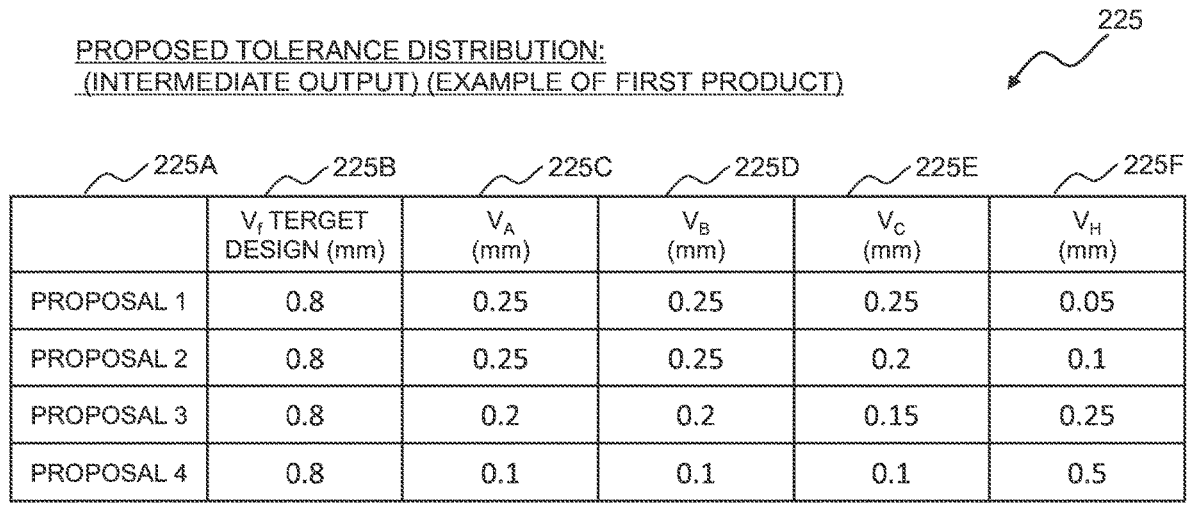
FIG. 12 is a diagram showing an example of proposed tolerance distributions generated by a tolerance distribution processing unit.

FIG. 12 is a diagram showing an example of proposed tolerance distributions generated by the tolerance distribution processing unit. The proposed tolerance distribution 225 stores therein, in accordance with a proposal 225A, a proposed value distribution among $V_f$ target design 225B, $V_A$ 225C, $V_B$ 225D, $V_C$ 225E, and $V_H$ 225F. This example of the proposed tolerance distribution 225 refers to intermediate output information related to the combination of numerical values such that the sum of the part dimension errors $V_A$, $V_B$, and $V_C$, and the assembly dimension error $V_H$ is "0.8 mm", in accordance with the tolerance calculation formula for the first product, and may be deleted after the completion of facility planning processing as will be described later. According to the present embodiment, there are four proposed examples for the first product, but the present embodiment is not to be considered limited thereto, and may be intended to encompass other products and multiple proposals.

Return to the description of FIG. 1. The tolerance distribution processing unit 231 refers to a processing unit that executes processing for creating proposed tolerance distributions. Specifically, the tolerance distribution processing unit 231 uses the input of the product information 401, the design specification information 402, the proposed product structure information 403, the proposed assembly process information 451, and the assembly tolerance information 404 to create multiple proposed tolerance distributions 225, and calculate part manufacturing costs and facility investment costs for each proposed tolerance distribution 225.

The facility planning processing unit 232 refers to a processing unit that executes processing for calculating the cost depending on a production plan. Specifically, the facility planning processing unit 232 creates proposed productions for each assembly line depending on the production plan, and calculates the assembly cost for each proposed production. For example, the facility planning processing unit 232 accepts, as input, the product design information 221, the process design information 222, the cost information 223, the product ion planning information 224, and the proposed tolerance distribution 225, and generates the product design information 221, the process design information 222, and the cost information 223.

In this regard, the input of the facility planning processing unit 232 may be adapted to receive information output from the tolerance distribution processing unit 231. In addition, the solution may be found without preparing all proposed candidates in advance by repeating the calculation with the output of the facility planning processing unit 232 as the input of the tolerance distribution processing unit 231. In addition, the tolerance distribution processing unit 231 may find the solution not only by generating the multiple proposed tolerance distributions 225 and then regarding the proposed tolerance distributions 225 as the input of the facility planning processing unit 232, but also repeating the calculation between the tolerance distribution processing unit 231 and the facility planning processing unit 232, such as generating one proposed tolerance distribution 225, then regarding the proposed tolerance distribution 225 as the input of the facility planning processing unit 232, returning the result to the tolerance distribution processing unit 232, and generating another new proposed tolerance distribution 225. This makes it possible to obtain design information at higher speed.

The input/output unit 210 controls the input/output of information handled by the product design and process design device 200.

Figure 2:
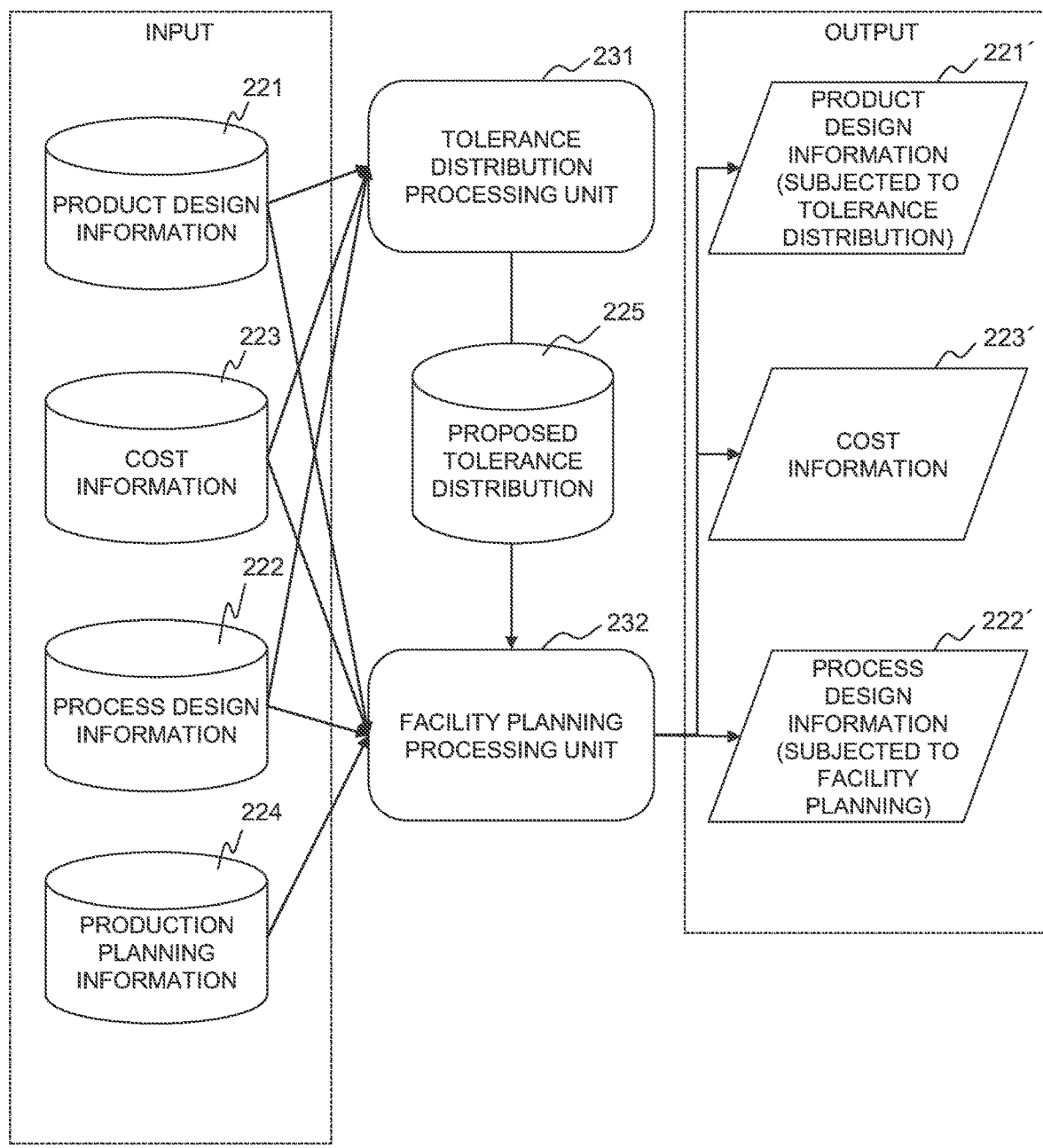
FIG. 2 is a diagram illustrating a data flow example related to the input/output by the product design and process design device.

FIG. 2 is a diagram illustrating a data flow example related to the input/output by the product design and process design device. The input data contains therein the product design information 221, the cost information 223, the process design information 222, and the production planning information 224. The output data contains therein product design information (subjected to the tolerance distribution) 221', cost information 223', and process design information (subjected to the facility planning) 222'. Then, the tolerance distribution processing unit 231 outputs the proposed tolerance distribution 225 as intermediate output, with the product design information 221, the cost information 223, and the process design information 222 as input, and the facility planning processing unit 232 outputs the product design information (subjected to the tolerance distribution) 221', the cost information 223', and the process design information (subjected to the facility planning) 222', with the product design information 221, the cost information 223, the process design information 222, the production planning information 224, and the proposed tolerance distribution 225 as input.

It is to be noted that the data flow shown in FIG. 2 is illustrated by way of example, which may vary according to modification examples of the present embodiment. For example, the intermediate output of the proposed tolerance distribution 225 by the tolerance distribution processing unit 231 may be made apparent as output information by the display on a screen or the like. Alternatively, the product design information (subjected to the tolerance distribution) 221', cost information 223', and process design information (subjected to the facility planning) 222' shown as output respectively have the same data structures as the product design information 221, the cost information 223, and the process design information 22, and thus, with the product design information (subjected to the tolerance distribution) 221', the cost information 223', and the process design information (subjected to the facility planning) 222' as input, the tolerance distribution processing unit 231 may execute processing or the like multiple times in a cyclic manner.

FIG. 3 is a diagram illustrating examples of the mode of using the product design and process design device. In an example 300 of using the device in a factory 800, the product design and process design device 200 which control the factory accepts input information associated with the production in the factory 800, and outputs (transmits) product design information and process design information suited for respective production lines 810A, 810B, and 810C of the factory 800 via a network 100 such as a LAN (Local Area Network), thereby making it possible to reduce the production cost in the factory. In addition, the device collects the operation performance for each production line and each facility constituting the production line via the network 100 or the like, and updates facility information based on the operation performance, thereby making the input of the product design and process design device into performance-based values, and allowing more reality-based product design and process design.

In an example 301 of using the device via a cloud environment 250, the product design and process design device 200 on the cloud environment 250 accepts (receives), via a network 50 such as the Internet, input information associated with the production in all factories 800A, 800B, and 800C which are capable of production, and outputs (transmits) product design information and process design information suited for respective production lines of all of the factories 800A, 800B, and 800C via the network 50, thereby making it possible to optimize the production cost in consideration of the production lines of all of the factories 800A, 800B, and 800C which are capable of production. In addition, the device collects, with respect to each factory, the operation performance for each production line and each facility constituting the production line via the network 50 or the like, and updates facility information based on the operation performance, thereby making the input of the product design and process design device into performance-based values, and allowing more reality-based product design and process design. It is to be noted that all of the factories which are capable of production may include own factories, factories of another company, and both of own factories and factories of another company.

Figure 20:
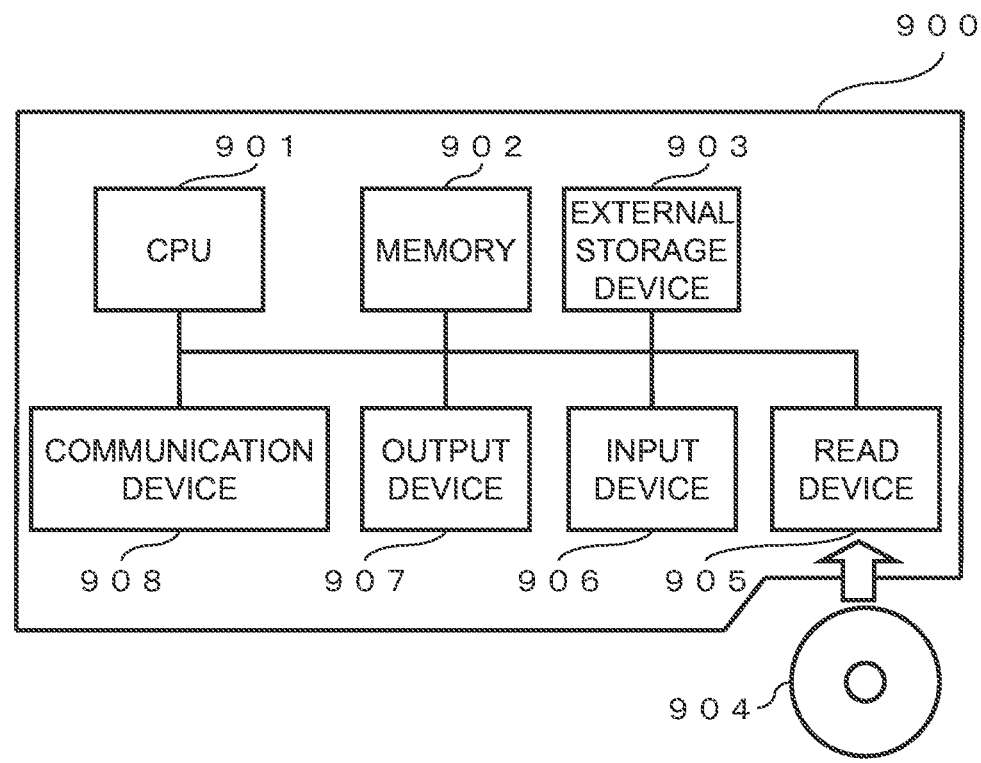
FIG. 20 is a diagram illustrating an example of the hardware configuration of a product design and process design device.

FIG. 20 is a diagram illustrating an example of the hardware configuration of the product design and process design device. The product design and process design device 200 can be achieved by a common computer 900 including a central processing unit (Central Processing Unit: CPU) 901, a memory 902, an external storage device 903 such as a hard disk drive (Hard Disk Drive: HDD), a read device 905 that writes and reads information as to a portable storage medium 904 such as a CD (Compact Disk) or a DVD (Digital Versatile Disk), an input device 906 such as a keyboard, a mouse, or a bar-code reader, an output device 907 such as a display, and a communication device 908 that communicates with another computer via a communication network such as the Internet, or a network system including a plurality of computers 900 configured as mentioned above.

For example, the control unit 230 can be achieved by loading, in the memory 902, a predetermined program stored in the external storage device 903, and executing the program in the CPU 901, the input/output unit 210 can be achieved by the CPU 901 using the input device 906 and the output device 907, and the storage unit 220 can be achieved by the CPU 901 using the memory 902 or the external storage device 903.

This predetermined program may be downloaded to the external storage device 903 from the storage medium 904 via the read device 905, or from the network via the communication device 908, then loaded on the memory 902, and executed by the CPU 901.

Alternatively, the program may be directly loaded on the memory 902 from the storage medium 904 via the read device 905, or from the network via the communication device 908, and executed by the CPU 901.

It is to be noted that without limitation thereto, the product design and process design device 200 may be, for example, a wearable computer that can be worn by a worker, such as a head set, a goggle, glasses, and an intercommunication system.

Figure 8:
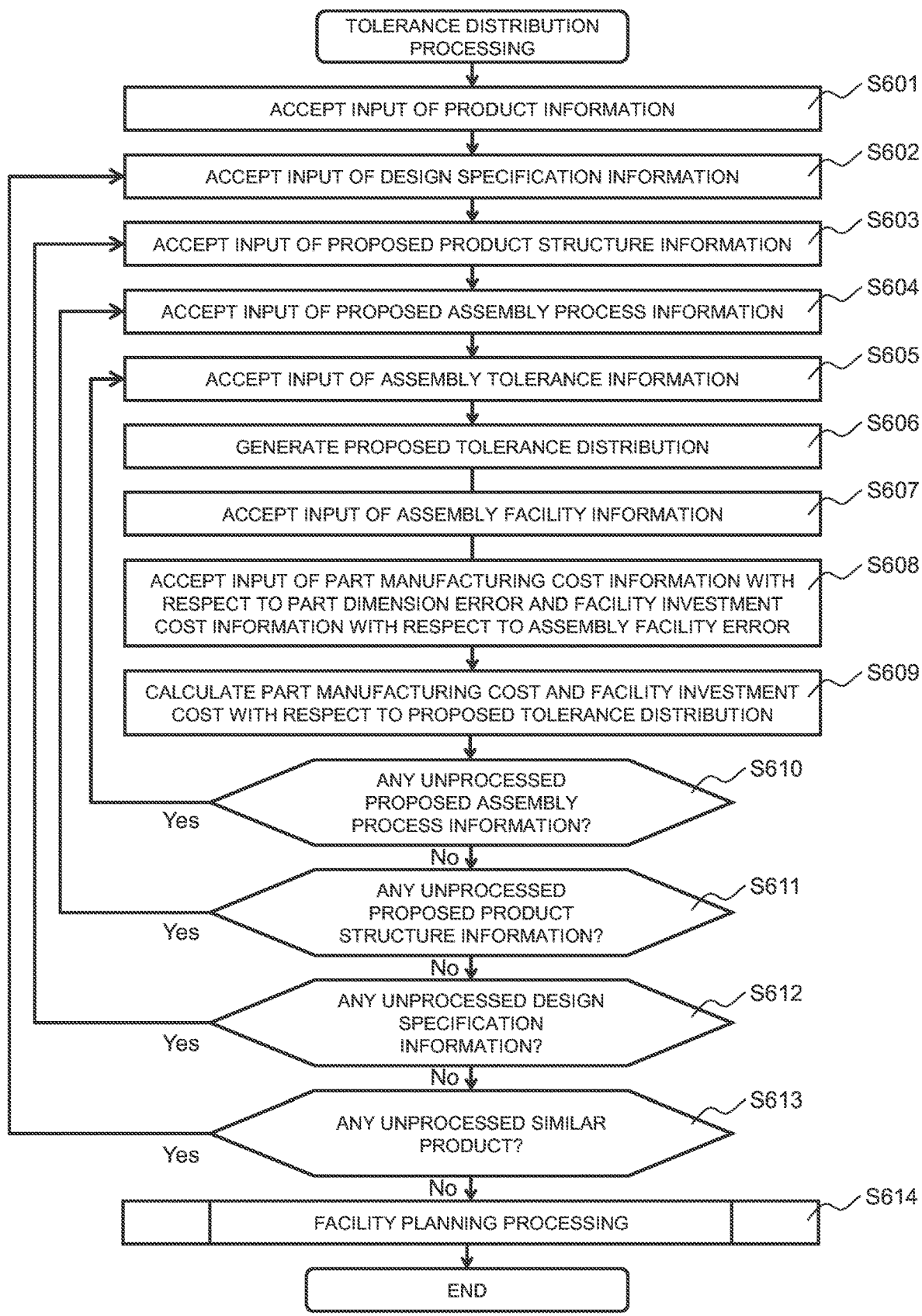
FIG. 8 is a diagram showing a flowchart example of tolerance distribution processing.

FIG. 8 is a diagram showing a flowchart example of tolerance distribution processing. The tolerance distribution processing is started when the input/output unit 210 of the product design and process design device 200 accepts a predetermined command.

First, the input/output unit 210 accepts the input of the product information 401 on all of products to be designed (step S601).

Then, the input/output unit 210 accepts the input of the design specification information 402 on one piece of the product information accepted in the input in the step S601 (step S602).

Then, the input/output unit 210 accepts the input of the proposed product structure information 403 for achieving a target design specification, on one of the design specifications accepted in the input in the step S602 (step S603).

Then, the input/output unit 210 accepts the input of the proposed assembly process information 451 containing the assembly order and assembly method of a target product structure, on one of the product structures accepted in the input in the step S603 (step S604).

Then, the input/output unit 210 accepts the input of the assembly tolerance information 404 corresponding to the product structure and one of assembly processes therefor (step S605).

Then the tolerance distribution processing unit 231 generates proposed combinations of numerical values for part dimension error and assembly facility error, which satisfy the tolerance calculation formula contained in the assembly tolerance information 404 accepted in the input in the step S605 (step S606). For the combinations of the numerical values, the tolerance distribution processing unit 231 generates all combinations, for example, by step size such as 0.01 mm. However, without limitation thereto, the tolerance distribution processing unit 231 may generate values for part dimension error in a random manner with the use of a random number table or the like, and calculate values for assembly facility error, which satisfy the tolerance calculation formula. The proposed combinations of numerical values for part dimension error and assembly facility error are subjected to intermediate output as the tolerance distribution information 415.

Then, the input/output unit 210 accepts the input of the proposed assembly facility information 453 related to the proposed assembly process information 451 accepted in the input in the step S604 (step S607).

Then, the input/output unit 210 accepts the input of the part manufacturing cost information 501 with respect to part dimension error and the facility investment cost information 502 with respect to assembly facility error (step S608).

Then, the tolerance distribution processing unit 231 calculates the part manufacturing costs and facility investment costs for the proposed tolerance distributions generated in the step S606 (step S609).

In this regard, according to the proposed tolerance distribution shown in FIG. 12, the design specifications for the first product have $V_f=0.8$ mm from the design specification information 402. In addition, since the tolerance calculation formula for the first product is the formula (2) above, the combinations of numerical values are generated such that the sum of the part dimension errors $V_A$, $V_B$, and $V_C$ for the part A, the part B, and the part C and the assembly dimension error $V_H$ is 0.8 mm. FIG. 12 lists therein only four proposal byway of example only, but the candidates are not limited thereto.

FIG. 16 is a diagram showing examples of the part manufacturing cost and facility investment cost with respect to the proposed tolerance distribution. In an example 700 of the part manufacturing cost, the costs of a part A 700B, a part B 700C, and a part C 700D are shown for each proposed tolerance 700A. In addition, in an example 710 of the facility investment cost, the costs of an additional investment 710B for each existing facility and a new investment 710C are shown for each proposed tolerance 710A.

In the step S609, the tolerance distribution processing unit 231 calculates the part manufacturing cost for the proposed tolerance distribution with the use of the values of part dimension errors for each part in accordance with each proposed tolerance distribution and the part manufacturing cost information 501 with respect to part dimension error. In addition, the tolerance distribution processing unit 231 calculates the facility investment cost for the proposed tolerance distribution, which is required in the case of an additional investment for an existing facility and in the case of a new investment, with the use of the values of assembly facility errors in accordance with each proposed tolerance distribution, the values of assembly facility errors of the proposed assembly facility information 453, and the facility investment cost information 502 with respect to assembly facility error.

For example, in the case of a proposal 1, with the assembly facility error $V_H$=0.05, referring to the facility investment cost information 502 with respect to assembly facility error, the initial facility investment cost of 1,000,000 dollars and the additional facility investment cost of 1,750,000 dollars are required for a new investment, and calculated as a facility investment cost of 2,750,000 dollars in total. For an additional investment to an existing facility "XA001", the additional facility investment cost of 500,000 is already invested to the "XA001" so as to satisfy the assembly facility error of "0.50", and in order to satisfy the assembly facility error $V_H$=0.05, required for the proposal 1, the difference from the additional facility investment cost of 1,750,000 dollars for the assembly facility error "0.05", 1,750,000 dollars−500,000 dollars=1,250,000 dollars, is calculated as a required facility investment cost.

In addition, for example, in the case of a proposal 4, with the assembly facility error $V_H$="0.5", referring to the facility investment cost information 502 with respect to assembly facility error, the initial facility investment cost of 1,000,000 dollars and the additional facility investment cost of 500,000 dollars are required for a new investment, and calculated as a facility investment cost of 1,500,000 dollars in total. For an additional investment to an existing facility "XA003", with the assembly facility error of "0.15" for "XA003", the error is smaller than the assembly facility error $V_H$="0.5" required for the proposal 4, no additional facility investment is thus required, and the facility investment cost is calculated as 0.

As in this example, the additional investment can be eliminated for all of existing facilities that have a higher accuracy (that is, a smaller value of error) than the assembly facility error required for the proposed tolerance distribution (that is, facilities already provided with required accuracy). However, the part manufacturing cost is increased by the large assembly facility error (that is, the low accuracy), when a tolerance distribution is made such that each part dimension error is reduced. More specifically, the part manufacturing cost has a tendency to fail to reach the minimum in accordance with the proposed tolerance distribution fully achieved with an accuracy that has a larger value than the assembly facility error of an existing facility.

Return to the description of a step S610 of the tolerance distribution processing in FIG. 8. The tolerance distribution processing unit 231 determines if there is any unprocessed proposed assembly process information (step S610). If there is no unprocessed proposed assembly process information (in the case of "No" in the step S610), the tolerance distribution processing unit 231 proceeds with the control to a step S611. If there is unprocessed proposed assembly process information (in the case of "Yes" in the step S610), the tolerance distribution processing unit 231 returns to the control to the step S605. The assembly tolerance calculation formula differs depending on the assembly process, and accordingly, the number of proposed candidates for the tolerance distribution will be increased.

Then, the tolerance distribution processing unit 231 determines if there is any unprocessed proposed product structure information (step S611). If there is no unprocessed proposed product structure information (in the case of "No" in the step S611), the tolerance distribution processing unit 231 proceeds with the control to a step S612. If there is unprocessed proposed product structure information (in the case of "Yes" in the step S611), the tolerance distribution processing unit 231 returns to the control to the step S604. The possible proposed assembly process differs depending on the product structure, and accordingly, the number of proposed candidates for the tolerance distribution will be increased.

Then, the tolerance distribution processing unit 231 determines if there is any unprocessed design specification information (step S612). If there is no unprocessed design specification information (in the case of "No" in the step S612), the tolerance distribution processing unit 231 proceeds with the control to a step S613. If there is unprocessed design specification information (in the case of "Yes" in the step S612), the tolerance distribution processing unit 231 returns to the control to the step S603. For one of the unprocessed design specifications, the input of the proposed product structure information 403 for achieving the target design specification is accepted, thereby making it possible to find a solution that simultaneously satisfies multiple design specifications.

Then, the tolerance distribution processing unit 231 determines if there is any unprocessed similar product (step S613). If there is no unprocessed similar product (in the case of "No" in the step S613), the tolerance distribution processing unit 231 proceeds with the control to a step S614. If there is an unprocessed similar product (in the case of "Yes" in the step S613), the tolerance distribution processing unit 231 returns to the control to the step S602. The possible design specifications differ depending on the product, and accordingly, the number of proposed candidates for the tolerance distribution will be increased.

The facility planning processing unit 232 executes facility planning processing (step S614). The facility planning processing will be described with reference to FIG. 9.

Figure 9:
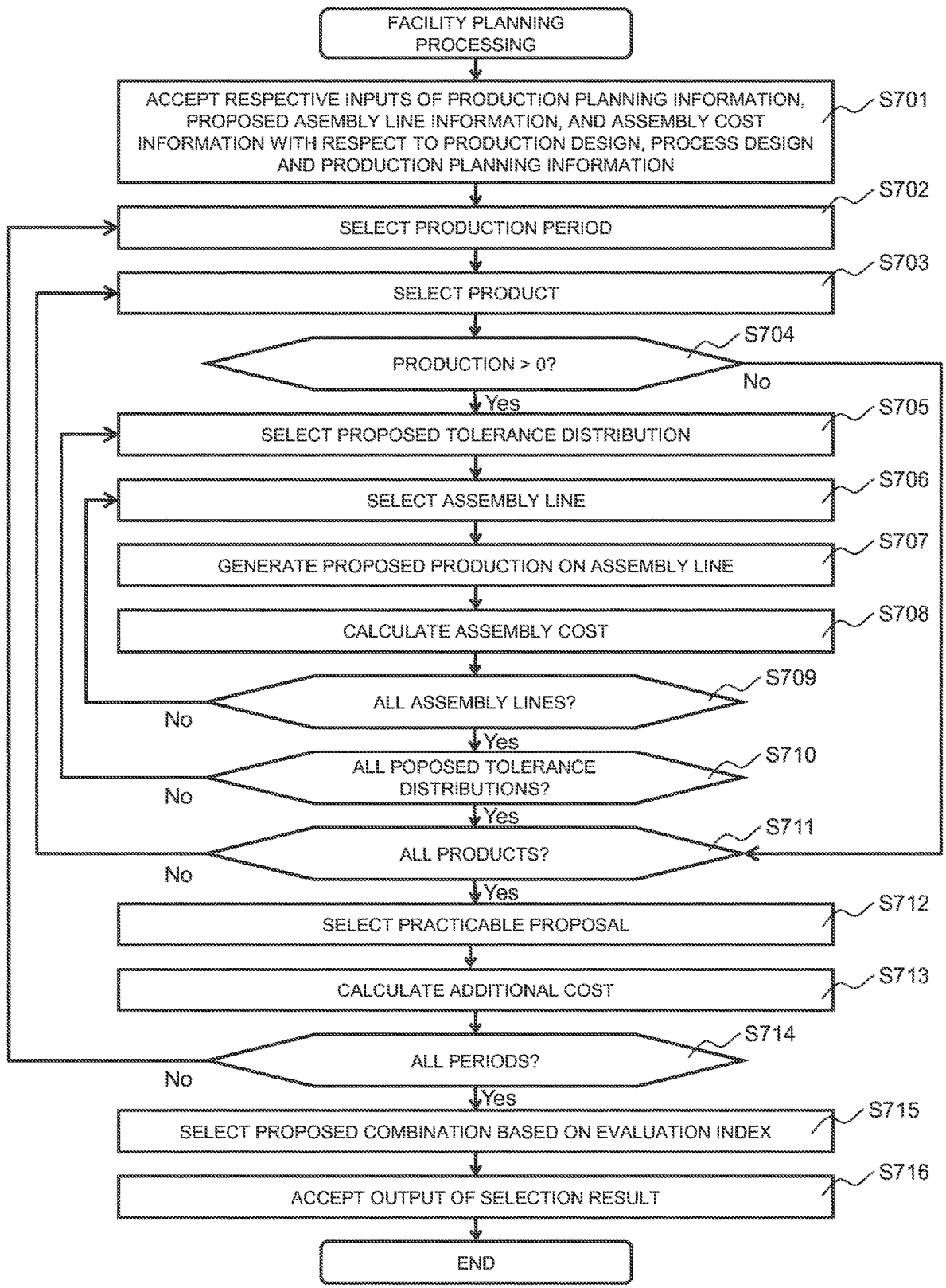
FIG. 9 is a diagram showing a flowchart example of facility planning processing.

FIG. 9 is a diagram showing a flowchart example of the facility planning processing. The facility planning processing is started in the step S614 of the tolerance distribution processing.

The input/output unit 210 accepts the respective inputs of the production planning information 224, the proposed assembly line information 452, and the assembly cost information 503 with respect to product design, process design, and product ion planning information (step S701).

Then, the facility planning processing unit 232 selects one of the production periods contained in the production planning information 224 (step S702).

Then, the facility planning processing unit 232 selects one of the target products contained in the product information 401 (step S703).

Then, the facility planning processing unit 232 determines if the product selected in the step S703 is produced for the production period selected in the step S702, that is, if the production is larger than 0 (step S704). If the production is larger than 0 (in the case of "Yes" in the step S704), the facility planning processing unit 232 proceeds with the control to a step S705. If the production is not larger than 0

(in the case of "No" in the step S704), the facility planning processing unit 232 proceeds with the control to a step S711.

Then, the facility planning processing unit 232 selects one of the proposed tolerance distributions generated in the step S606 for the product selected in the step S703 (step S705). In accordance with the selection of the proposed tolerance distribution, the part manufacturing cost is obtained uniquely from the calculation result in the step S609.

Then, the facility planning processing unit 232 selects one of the assembly lines from the proposed assembly line information 452 (step S706). In accordance with the selection of the assembly line, the assembly facility of the assembly line is determined uniquely. With the assembly facility determined, the facility investment cost is obtained uniquely from the calculation result in the step S609.

Then, the facility planning processing unit 232 generates a proposed production of the product selected in the step S703, with the use of the assembly line selected in the step S706 (step S707). In this regard, in the generation of the proposed product, options that can be taken for the relation between the product and the assembly line will be mentioned. When one type of product is not permitted to be assembled on multiple lines at the same time, the proposed production is 0 or the total production. On the other hand, when one type of product is permitted to be assembled on multiple lines at the same time, the proposed production is "0" or any number not to exceed the total production. Then, since the production has an integer value, the facility planning processing unit 232 may generate all combinations for "0" to the total production. Alternatively, the facility planning processing unit 232 may generate combinations by any step size. Alternatively, the facility planning processing unit 232 may generate the production in a random manner with the use of a random number table or the like. In addition, even when one type of product is permitted to be assembled on multiple lines at the same time, the maximum number of assembly lines permitted may be limited.

Then, the facility planning processing unit 232 calculates the assembly cost with reference to the assembly cost information 503 with respect to product design, process design, and production planning information, with a product structure, an assembly process, a tolerance distribution, an assembly line, an assembly facility, and the like as variables (step S708).

Then, the facility planning processing unit 232 determines if the processing is executed for all of proposed candidates for the assembly line (step S709). If the processing is not executed for all of the proposed candidates for the assembly line so that there is any unprocessed assembly line (in the case of "No" in the step S709), the facility planning processing unit 232 returns the control to the step S706. If the processing is executed for all of the proposed candidates for the assembly line (in the case of "Yes" in the step S709), the facility planning processing unit 232 proceeds with the control to a step S710.

Then, the facility planning processing unit 232 determines if the processing is executed for all of the proposed tolerance distributions (step S710). If the processing is not executed for all of the proposed tolerance distributions so that there is any unprocessed proposed tolerance distribution (in the case of "No" in the step S710), the facility planning processing unit 232 returns the control to the step S705. If the processing is executed for all of the proposed tolerance distributions (in the case of "Yes" in the step S710), the facility planning processing unit 232 proceeds with the control to a step S711.

Then, the facility planning processing unit 232 determines if the processing is executed for all of the products (step S711). If the processing is not executed for all of the products so that there is any unprocessed product (in the case of "No" in the step S711), the facility planning processing unit 232 returns the control to the step S703. If the processing is executed for all of the products (in the case of "Yes" in the step S711), the facility planning processing unit 232 proceeds with the control to a step S712.

Then, the facility planning processing unit 232 selects practicable proposals from the combinations of the proposed productions on the assembly lines for all of the products (step S712). In this regard, the practicable proposal refers to a proposal that satisfies the following conditions: (1) the total of the productions on all assembly lines for assembling any product coincides with the production of the production planning; and (2) the total of the productions of all products assembled on any assembly line is less than or equal to the maximum production of the assembly line.

It is to be noted that there may be additional options for relaxing the condition (2) mentioned above. For example, the maximum production of the assembly line may be relaxed by permitting excess operation such as overtime work by workers for the assembly line. In addition, the maximum production may be permitted to be increased by an additional investment to the assembly line.

Then, the facility planning processing unit 232 calculates an additional cost generated when an additional option is selected in the step S712 (step S713). For example, the facility planning processing unit 232 calculates the increase in assembly cost by overtime work, and calculates the additional investment cost for increasing the maximum production.

Then, the facility planning processing unit 232 determines if the processing is executed for all of the production periods (step S714). If the processing is not executed for all of the production periods so that there is any unprocessed production period (in the case of "No" in the step S714), the facility planning processing unit 232 returns the control to the step S702. If the processing is executed for all of the production periods (in the case of "Yes" in the step S714), the facility planning processing unit 232 proceeds with the control to a step S715.

Then, the facility planning processing unit 232 selects, from among the practicable proposals, a combination based on an evaluation index (step S715). For example, the facility planning processing unit 232 adopts the total production cost as the evaluation index, and selects the combination of the tolerance distribution information and the facility planning information, which minimizes the total production cost. In this regard, the total production cost can be calculated as the sum of the part manufacturing cost, the facility investment cost, and the assembly cost.

The determination of the combination of products assembled on each assembly line provides facility planning information as shown in FIG. 19. This example is a result example that is provided when it is determined that one type of product is not permitted to be assembled on multiple assembly lines around the same time in the step S707.

It is possible to calculate the total production for each assembly line in each production month from the relation between production month and products in FIG. 17 and the relation between production month and products manufactured on each assembly line in FIG. 19. For example, from FIG. 19, the products assembled on an assembly line L002 in a production month of April 2017 (17/4) can be identified as a third product and a fourth product. From FIG. 17, the productions of the third product and the fourth product in the production month of April 2017 (17/4) are respectively 8,000 products and 28,000 products. Therefore, the total production of the products assembled on the assembly line L002 in the production month of April 2017 (17/4) can be calculated to be 36,000 products.

The maximum production of the assembly line L002 is 50,000 products/month according to the assembly line information in FIG. 18. Therefore, the operating rate of the assembly line L002 in the production month of April 2017 (17/4) can be calculated to be 36,000/50,000×100%=72%. Accordingly, as the evaluation index for the selection of the combination from among the practicable proposals, the operating rate may be used as mentioned above besides the total production cost.

In addition, the example of FIG. 19 shows the result of changing a sixth product from an assembly line L004 to an assembly line L003 in a production month of October 2018 (18/10). There is a possibility that such a change of an assembly line on which a product is assembled may degrade the quality or generate additional operation time and operation cost. As the evaluation index for the selection of the combination from among the practicable proposals, the frequency of changing the assembly line on which the product is assembled or the like may be used.

In addition, the calculation of the operation cost of changing the assembly line as an additional cost in the step S713 makes it possible to make a similar selection.

In addition, even when the processing of defining the operation time taken to change the assembly line, forbidding the assembly operation for the operation time taken, and then decreasing the maximum production for the period of time to evaluate the practicability is executed in the step S712, a similar selection is allowed to be made.

There is also a possibility that an additional investment for an assembly facility may be required at the timing of making a change to an assembly line on which a product is assembled. The facility investment cost for any production period is calculated in the step S706, and it is thus possible to calculate the facility investment cost and the timing. The facility investment cost and the timing may be used as evaluation indexes. For example, it becomes possible to select a proposal such that the timing of facility investment is not coincident with other timing.

In addition, all of the practicable proposals may be regarded as output objects along with the evaluation index.

Then, the input/output unit 210 outputs the selection result in the step S715 (step S716).

The foregoing provides the flows of the tolerance distribution processing and facility planning processing. According to the tolerance distribution processing and the facility planning processing, the product design and the process design can be achieved with greater investment efficiency.

Figure 21:
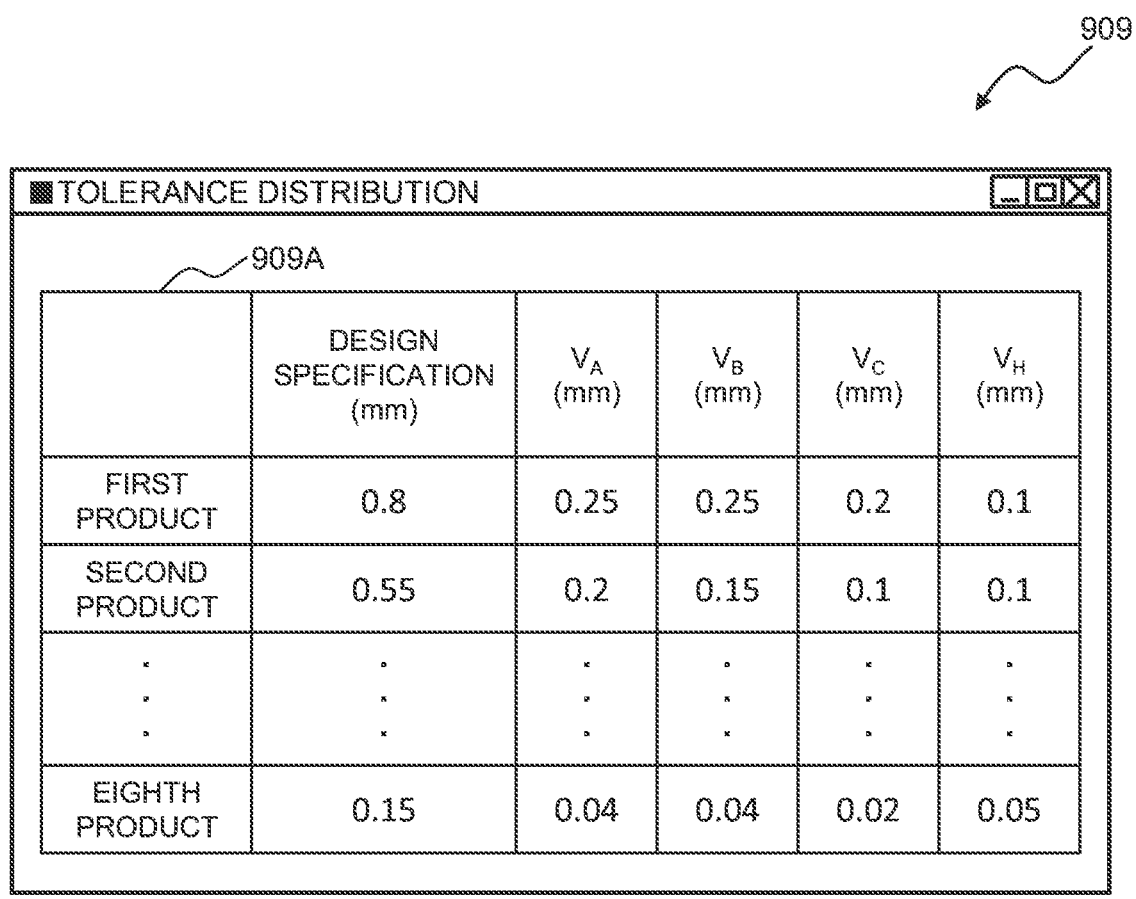
FIG. 21 is a diagram illustrating an example of an output screen for tolerance distribution information.

FIG. 21 is a diagram illustrating an example of an output screen for tolerance distribution information. The output screen 909 for tolerance distribution information corresponds to an example of the output of the tolerance distribution information 415 in the step S716. The tolerance distribution results for each product are displayed as a list 909A on the output screen 909 for tolerance distribution information.

Figure 22:
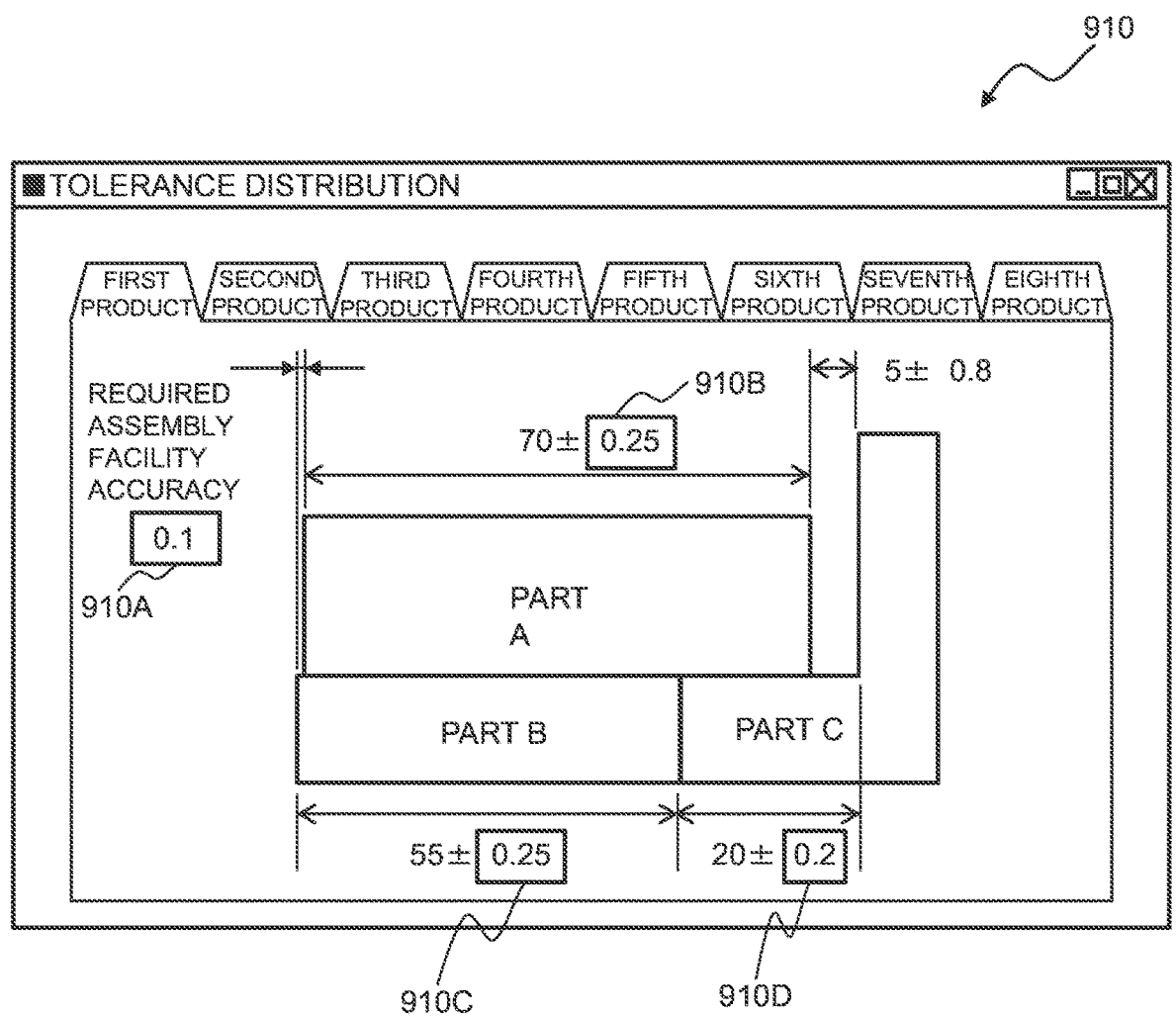
FIG. 22 is a diagram illustrating an example of an output screen for tolerance distribution information (on drawing)

FIG. 22 is a diagram illustrating an example of an output screen for tolerance distribution information (on drawing). The output screen 910 for tolerance distribution information (on drawing) is another output mode for the tolerance distribution information 415 in the step S716. On the output screen 910 for tolerance distribution information (on drawing), values 910A to 910D for tolerance distribution results are displayed in an overlapped manner for the images, drawings, or three-dimensional models of the product structures.

Figure 23:
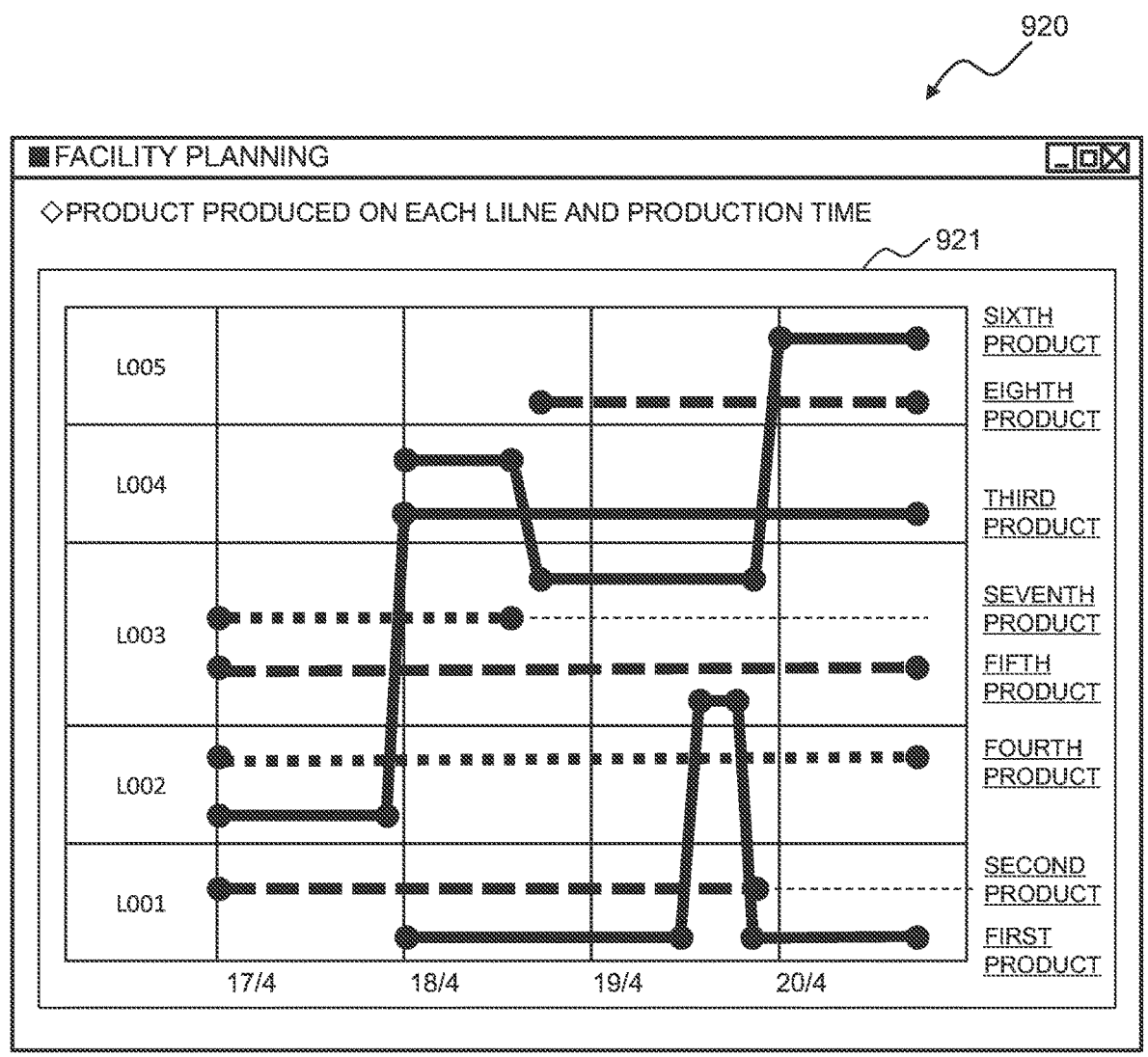
FIG. 23 is a diagram illustrating an example of an output screen for facility planning information.

FIG. 23 is a diagram illustrating an example of an output screen for facility planning information. On the output screen 920 for facility planning information, the facility planning information shown in FIG. 19 in the step S716 is displayed as a graph. This graphically illustrated output mode makes it possible read, in an intuitive way, the timing of changing an assembly line on which a product is assembled.

Figure 24:
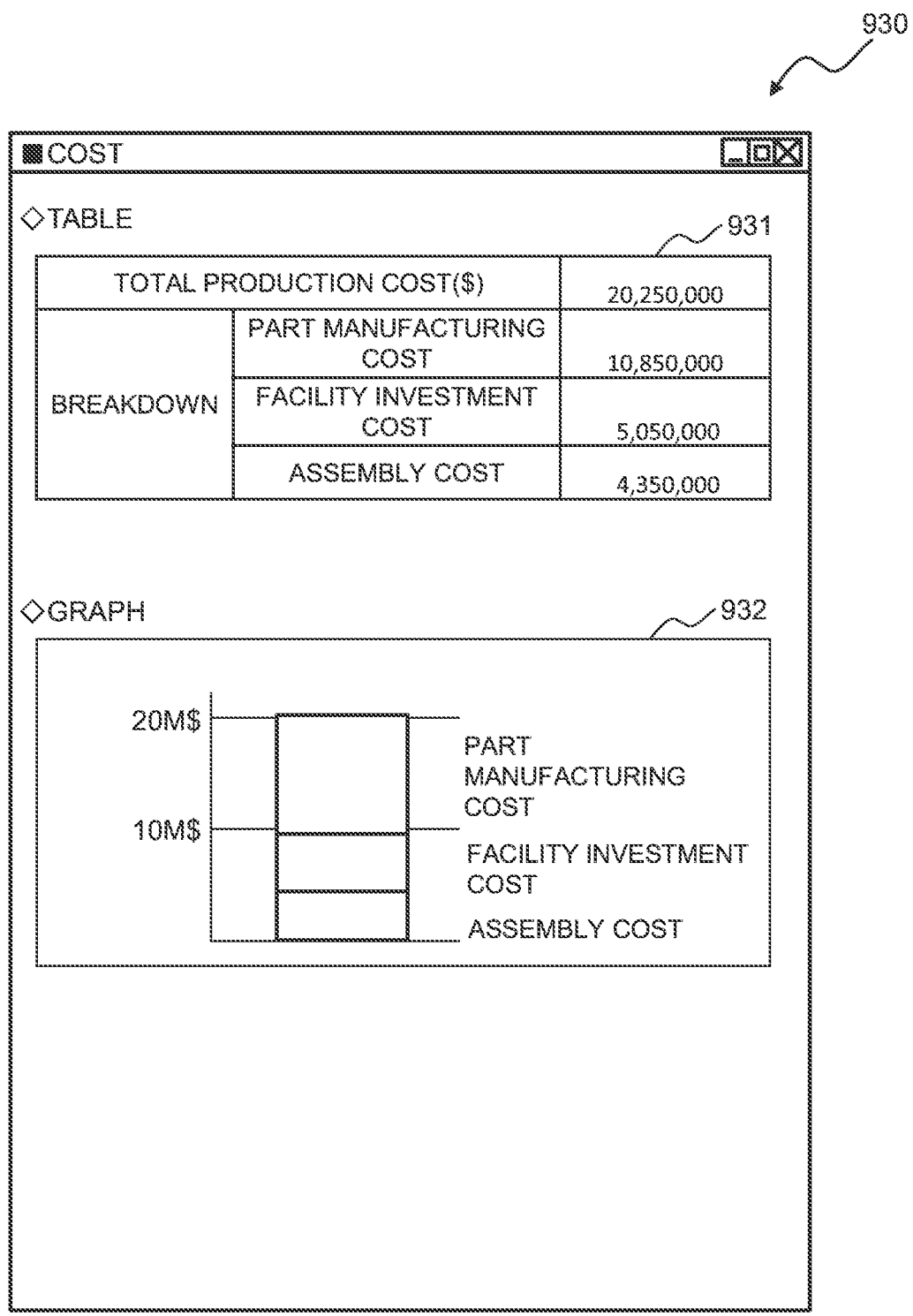
FIG. 24 is a diagram illustrating an example of an output screen for cost information.

FIG. 24 is a diagram illustrating an example of an output screen for cost information. On the output screen 930 for cost information, a table 931 that shows the total production cost and the cost breakdown thereof and a graph 932 that visualizes the table are displayed in the step S716. This output mode makes it possible read the total cost and the breakdown thereof in an intuitive way.

Figure 25:
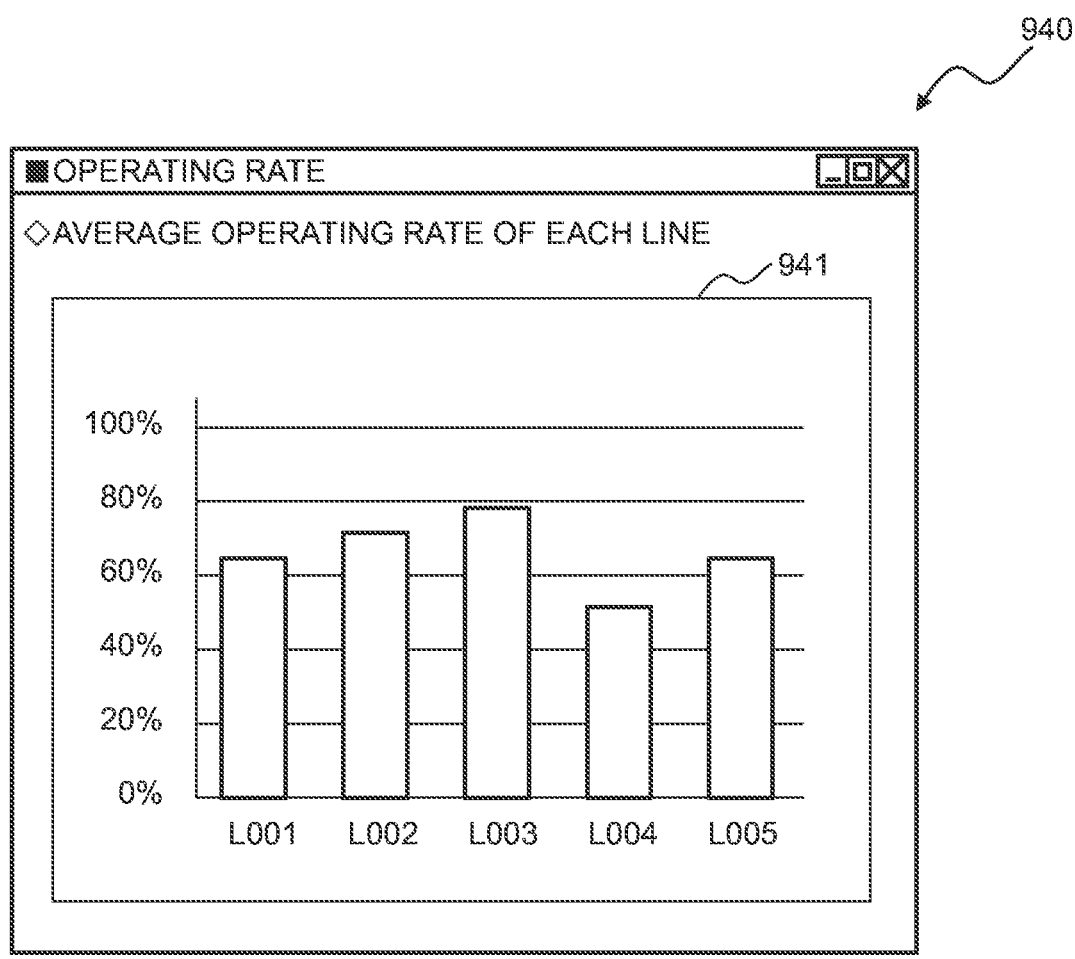
FIG. 25 is a diagram illustrating an example of an output screen for the operating rates of assembly lines.

FIG. 25 is a diagram illustrating an example of an output screen for the operating rates of assembly lines. On the output screen 940 for the operating rates of assembly lines, the operating rates for each assembly line, calculated on the basis of the facility planning information 464, are displayed in the step S716. As a mode of the output, the operating rates for each line are displayed as a graph 941.

The foregoing provides the embodiment according to the present invention. The embodiment according to the present invention can provide a product design and process design device with greater investment efficiency.

The embodiment mentioned above has been described in detail for clearly explaining the present invention, but are not necessarily to be considered limited to the inclusion of all of the configurations described. It is possible to replace a part of a configuration according to an embodiment with another configuration, and in addition, it is also possible to add a configuration according to an embodiment to a configuration according to another embodiment. In addition, it is also possible to remove a part of a configuration according to an embodiment.

In addition, the respective parts, configurations, functions, processing units, etc. mentioned above may be partially or entirely achieved with hardware, for example, by designing with integrated circuits. In addition, the respective parts, configurations, functions, etc. mentioned above may be achieved with software in a way that a processor interprets and executes programs for achieving the respective functions. Information such as programs, tables, and files for achieving the respective functions can be stored on recording devices such as memories and hard disks, or recording media such as IC cards, SD cards, and DVDs.

It is to be noted that the control lines and information lines according to the embodiment described above are shown which are considered required for the sake of explanation, but all of the control lines and information lines required for a product are not always shown. In fact, it is conceivable that almost all of the configurations are interconnected. The present invention has been described above mainly with respect to the embodiment.

It is to be noted that the present invention can be also considered to have the following technical features. When the addition of the measurement step as represented by the formula (3) mentioned above makes it possible to use actually measured errors, the tolerance calculation formula can be also simplified. Thus, this feature can allow more viable proposed tolerance distributions to be created.

In addition, the tolerance distribution processing unit 231 generates one proposed tolerance distribution 225 as the input to the facility planning processing unit 232, which returns the result to the tolerance distribution processing unit 231, and generates another new proposed tolerance distribution 225, thereby making it possible to repeat the calculation between the tolerance distribution processing unit 231 and the facility planning processing unit 232, and then find a solution. This feature can allow design information to be obtained at higher speed.

In addition, the product design and process design device may be configured to display a screen that illustrates any of the tolerance distribution, facility planning, cost, and operating rate adopted. Among the types of information, the tolerance distribution may be displayed such that the position and amount of the tolerance are overlapped in an assembly drawing. This feature can allow more easy-to-digest design information to be obtained.

In addition, the facility planning processing unit may be configured to execute the processing of defining the operation time taken to change the product assembly line, forbidding the assembly operation for the operation time taken, and then decreasing the maximum production for the period of time to evaluate the proposed tolerance distribution. This feature can allow design information of higher accuracy to be obtained.

In addition, the facility planning processing unit may be configured to calculate an additional investment cost for an assembly facility at the timing of making a change to an assembly line on which a product is assembled, and specify the facility investment cost and the timing thereof, for the use of the facility investment cost and the timing as evaluation indexes. This feature can al low more rational design information to be obtained.

What is claimed is:

1. A product design and process design device comprising:
    a storage device that stores:
    design specification information containing a tolerance of at least one dimensional variation of an assembled product,
    part dimension error information on plural part dimensional errors of plural parts of the product, related to the design specification information,
    assembly facility error information on plural assembly facility errors of plural facilities that assemble the product,
    assembly tolerance information containing at least one relational expression for the assembled product among the design specification information, the part dimension error information, and the assembly facility error information,
    part manufacturing cost information on plural costs with respect to the part dimension error information, and
    facility investment cost information on plural costs with respect to the assembly facility error information; and
    a processor programmed to:
    generate plural proposed tolerance distributions that are different combinations with respect to the plural part dimension errors and plural assembly facility errors and which satisfy the design specification information using the assembly tolerance information, and
    calculate respective part manufacturing costs for each of the plural proposed tolerance distributions based on part manufacturing cost information,
    calculate facility investment costs based on the plural assembly facility errors for each of the proposed tolerance distributions based on the facility investment cost information,
    calculate, as an evaluation index, total production costs respectively comprising sums of the part manufacturing costs and the facility investment costs for each of the plural proposed tolerance distributions, and
    determine a proposed tolerance distribution from the plural proposed tolerance distributions according to the evaluation index, and
    output the optimum proposed tolerance distribution which specifies a combination of the part dimension errors and one of the assembly facility errors which satisfy the design specification information for the assembled product, and
    wherein the processor is further programmed to:
    accept, as input, existing and new pieces of assembly line information for the plural facilities, the assembly line information containing assembly facility information, and
    use the assembly facility errors included in the proposed tolerance distributions and the assembly facility information to calculate the facility investment costs and determine an assembly line configuration for assembling the product,
    wherein the assembly line configured is used to assemble the product in at least one of the plural facilities.

2. The product design and process design device according to claim 1,
    wherein the storage device further stores multiple pieces of assembly process information containing assembly orders and assembly methods of assembling the product, and multiple pieces of the assembly tolerance information each contain at least one relational expression for the assembled product that differ from each other between the pieces of the assembly process information.

3. The product design and process design device according to claim 2,
    wherein the storage device further stores multiple pieces of assembly structure information containing structures of the assembled product that satisfy the design specification information, the pieces of assembly process information that differ from each other between the pieces of assembly structure information, and the pieces of assembly tolerance information that differ from each other between the pieces of assembly process information.

4. The product design and process design device according to claim 1,
    wherein the storage device stores multiple pieces of the design specification information on the assembled product, and
    the processor is further programmed to:
    generate the plural proposed tolerance distributions that simultaneously satisfy the multiple pieces of design specification information.

5. The product design and process design device according to claim 1,
    wherein the storage device stores multiple pieces of the design specification information, and multiple pieces of assembly tolerance information that differ from each other between the pieces of the design specification information.

6. The product design and process design device according to claim 1,
    wherein the processor is further programmed to:
    accept, as input, existing and new pieces of assembly facility information for the plural facilities, use the assembly facility errors and the assembly facility information to calculate the facility investment costs.

7. The product design and process design device according to claim 1,
wherein the processor is further programmed to:
accept, as input, production planning information containing production amounts of the assembled product for each of plural production periods,
use the production planning information to calculate, for each of the production periods, assembly lines, and types of target products and productions of the products.

8. The product design and process design device according to claim 7,
wherein the processor is further programmed to:
permit an increase in maximum production on an assembly line by overtime work, and specify an optimum solution for a paradoxical relation between an increase in production for each of the production periods and an increase in cost by overtime work.

9. The product design and process design device according to claim 7,
wherein the processor is further programmed to:
permit an increase in maximum production on an assembly line by a facility investment, and specify an optimum solution for a paradoxical relation between an increase in production for each of the production periods and an increase in cost by a facility investment.

10. The product design and process design device according to claim 7,
wherein the processor is further programmed to:
accept, as input, whether one type of product is permitted to be assembled on multiple assembly lines at a time, and
calculate, for each of the production periods, assembly lines, and types of target products and productions of the products, depending on whether one type of product is permitted to be assembled on multiple assembly lines at a time.

11. The product design and process design device according to claim 7,
wherein the processor is further programmed to:
calculate, as the evaluation index, total production costs respectively comprising sums of the part manufacturing costs, the facility investment costs, and assembly costs.

12. The product design and process design device according to claim 7,
wherein the processor is further programmed to:
prioritize a proposed tolerance distribution that maximizes an operating rate that refers to a proportion of a production for any of the production periods to a maximum production on a respective assembly line.

13. The product design and process design device according to claim 7,
wherein the processor is further programmed to:
prioritize a proposed tolerance distribution that minimizes a frequency of changing an assembly line on which a product is assembled.

14. The product design and process design device according to claim 1,
wherein the processor is further programmed to:
update the assembly facility error information when operation performance of an existing assembly line is input.

15. The product design and process design device according to claim 1,
the processor is further programmed to:
accept, as input, proposed assembly line information containing a maximum production for each production period, and production planning information containing productions for each production period,
update the assembly facility error information and the maximum production when operation performance of an existing assembly line is input, and
use the production planning information and the maximum production to calculate types of target products and productions of the products with respect to each assembly line for each of the production periods.

16. A product design and process design device comprising:
a storage device; and
a processor programmed to:
communicate with another device on a network to receive:
design specification information containing a tolerance of at least one dimensional variation of an assembled product,
part dimension error information on plural part dimensional errors of plural parts of the product, related to the design specification information,
assembly facility error information on plural assembly facility errors of plural facilities that assemble the product,
assembly tolerance information containing at least one relational expression for the assembled product among the design specification information, the part dimension error information, and the assembly facility error information,
part manufacturing cost information on plural costs with respect to the part dimension error information, and
facility investment cost information on plural costs with respect to the assembly facility error information;
store the design specification information, the part dimension error information, the assembly facility error information, the assembly tolerance information, the part manufacturing cost information, and the facility investment cost information in the storage device;
generate plural proposed tolerance distributions that are different combinations with respect to the plural part dimension errors and plural assembly facility errors and which satisfy the design specification information using the assembly tolerance information,
calculate respective part manufacturing costs for each of the plural proposed tolerance distributions based on part manufacturing cost information,
calculate facility investment costs based on the plural assembly facility errors for each of the proposed tolerance distributions based on the facility investment cost information,
calculate, as an evaluation index, total production costs respectively comprising sums of the part manufacturing costs and the facility investment costs for each of the plural proposed tolerance distributions,
determine an optimum proposed tolerance distribution from the plural proposed tolerance distributions according to the evaluation index, and
output product design information and process design information depending on the optimum proposed tolerance distribution which specifies a combination of the part dimension errors and one of the assembly facility errors which satisfy the design specification information for the assembled product to a device on a corresponding production line, wherein the product is assembled based on the output product design information and process design information.

\* \* \* \* \*